United States Patent
Oh et al.

(10) Patent No.: US 8,452,430 B2
(45) Date of Patent: May 28, 2013

(54) METHOD AND AN APPARATUS FOR PROCESSING AN AUDIO SIGNAL

(75) Inventors: Hyen O Oh, Seoul (KR); Yang Won Jung, Seoul (KR)

(73) Assignee: LG Electronics Inc., Seoul (KR)

(*) Notice: Subject to any disclaimer, the term of this patent is extended or adjusted under 35 U.S.C. 154(b) by 845 days.

(21) Appl. No.: 12/503,456

(22) Filed: Jul. 15, 2009

(65) Prior Publication Data

US 2010/0017003 A1    Jan. 21, 2010

Related U.S. Application Data

(60) Provisional application No. 61/080,692, filed on Jul. 15, 2008.

(51) Int. Cl.
| | |
|---|---|
| G06F 17/00 | (2006.01) |
| G11B 20/10 | (2006.01) |
| G06F 3/00 | (2006.01) |
| G06F 3/01 | (2006.01) |

(52) U.S. Cl.
CPC . *G11B 20/10* (2013.01); *G06F 3/00* (2013.01); *G06F 3/01* (2013.01)
USPC ............. 700/94; 715/716; 715/727; 715/728; 381/56; 381/104; 381/105; 381/106; 381/107; 381/108; 381/109

(58) Field of Classification Search
USPC .......................................................... 700/94
See application file for complete search history.

(56) References Cited

U.S. PATENT DOCUMENTS 7,613,306 B2    11/2009   Miyasaka et al.
(Continued)

FOREIGN PATENT DOCUMENTS

CN          1554098 A      12/2004
(Continued)

OTHER PUBLICATIONS

SAOC: MPEG 2007: Spatial Audio Object Coding: copyright 2007.*
(Continued)

*Primary Examiner* — Paul McCord
(74) *Attorney, Agent, or Firm* — Birch, Stewart, Kolasch & Birch, LLP

(57) ABSTRACT

An apparatus for processing an audio signal and method thereof are disclosed. The apparatus comprises an information receiving unit receiving a downmix signal including and a plurality of preset informations; an external preset information receiving unit receiving a plurality of external preset informations being inputted from external; an external preset applying-determining unit determining whether the plurality of the external preset informations applies to the downmix signal; an external preset information selecting unit selecting one external preset information, if the plurality of external preset informations is selected; and a rendering unit controlling the object by applying the external preset information to the all data regions.

Accordingly, an audio signal can be efficiently reconstructed by individually selecting and applying external preset information by a data region unit or by selecting and applying the same external preset information to a whole downmix signal. And, feedback information can be received from a user by displaying an object adjusted by having external preset rendering parameter applied thereto on a screen, according to a characteristic of an audio source.

13 Claims, 17 Drawing Sheets

U.S. PATENT DOCUMENTS

| | | | |
|---|---|---|---|
| 7,696,907 | B2 | 4/2010 | Pang et al. |
| 8,005,243 | B2 * | 8/2011 | Terada et al. .................. 381/119 |
| 2004/0237750 | A1 | 12/2004 | Smith et al. |
| 2006/0174267 | A1 * | 8/2006 | Schmidt ........................... 725/39 |
| 2007/0041278 | A1 * | 2/2007 | Tsujimoto ........................... 369/1 |
| 2007/0058033 | A1 * | 3/2007 | Tsai et al. .................. 348/14.05 |
| 2007/0127733 | A1 | 6/2007 | Henn et al. |
| 2007/0206690 | A1 | 9/2007 | Sperschneider et al. |
| 2008/0049943 | A1 | 2/2008 | Faller et al. |
| 2008/0125044 | A1 * | 5/2008 | Kim .............................. 455/41.2 |
| 2008/0140426 | A1 | 6/2008 | Kim et al. |
| 2009/0055005 | A1 | 2/2009 | Oxman et al. |
| 2009/0062944 | A1 * | 3/2009 | Wood et al. ..................... 700/94 |
| 2010/0076577 | A1 * | 3/2010 | Lee et al. ......................... 700/94 |
| 2010/0121647 | A1 * | 5/2010 | Beack et al. .................. 704/500 |

FOREIGN PATENT DOCUMENTS

| | | |
|---|---|---|
| CN | 1957640 A | 5/2007 |
| CN | 101014999 A | 8/2007 |
| CN | 101160618 A | 4/2008 |
| CN | 101180674 A | 5/2008 |
| EP | 1853092 A1 | 11/2007 |
| EP | 2083584 | 7/2009 |
| EP | 2083585 A1 | 7/2009 |
| JP | 2000-209699 A | 7/2000 |
| KR | 10-2004-0034730 A | 4/2004 |
| KR | 10-2008-0063155 A | 7/2008 |
| WO | WO-2007/083957 A1 | 7/2007 |
| WO | WO 2007/128523 A1 | 11/2007 |
| WO | WO 2008/039038 A1 | 4/2008 |
| WO | WO 2008/039041 A1 | 4/2008 |
| WO | WO 2008/039043 A1 | 4/2008 |
| WO | WO 2008/069593 A1 | 6/2008 |
| WO | WO 2008/078973 A1 | 7/2008 |
| WO | WO-2008/111770 A1 | 9/2008 |

OTHER PUBLICATIONS

Taejin Lee et al., "A Personalized Preset-based Audio System for Interactive Service" Audio Engineering Society Convention Paper, New York, NY, US, [online] No. 6904, Oct. 5, 2006, pp. 1-6, XP002531682.

Jung et al., "Personalized Music Service Based on Parametric Object Oriented Spatial Audio Coding", Proceedings AES 34th International Conference: "New Trends in Audio for Mobile and Handheld Device" Aug. 28, 2008, pp. 1-5. XP002547897.

Nilsson, ID3 Draft Specification: Copyright Nov. 1, 2000, pp. 1-41.

* cited by examiner

FIG. 10

| Syntax | No.of bits | Mnemonic |
|---|---|---|
| SAOCSpecificConfig()<br>{<br>    bsSamplingFrequencyIndex;<br>    ⋮<br>    ByteAlign();<br>    SAOCExtensionConfig();<br>} | 4 | uimsbf |

| Syntax | No.of bits | Mnemonic |
|---|---|---|
| SAOCExtensionConfigData(9)<br>{<br>    PresetConfig();<br>} | | |

| Syntax | No.of bits | Mnemonic |
|---|---|---|
| PresetConfig()<br>{<br>    bsNumPresets; | 4 | uimsbf |
|     for ( i=0; i<bsNumPresets+1; i++ ) {<br>        bsNumCharPresetLabel[i]; | 8 | uimsbf |
|         for ( j=0; j<bsNumCharPresetLabel[i]; j++ ) {<br>            bsPresetLabel[i][j];<br>        } | 8 | bslbf |
|         bsPresetMatrix; | 1 | uimsbf |
|         If (bsPresetMatrix) {<br>            PresetMatrixData();<br>        } else {<br>            PresetUserData();<br>        }<br>    }<br>} | | |

FIG. 11

| Syntax | No.of bits | Mnemonic |
|---|---|---|
| SAOCFrame() {<br>    FramingInfo();<br>    ⋮<br>    ByteAlign();<br>    SAOCExtensionFrame();<br>} | | Note 1 |
| Note 1: FramingInfo() is defined in ISO/IEC FDIS 23003-1 : 2006, Table 16<br>Note 2: EcData() is defined in ISO/IEC FDIS 23003-1 : 2006, Table 23 | | |

| Syntax | No.of bits | Mnemonic |
|---|---|---|
| SAOCExtensionFrame(9)<br>{<br>    for ( i=0; i<bsNumPresets+1; i++ ) {<br>        if (bsPresetMatrix) {<br>            PresetMatrixData();<br>        } else {<br>            PresetUserData();<br>        }<br>    }<br>} | | |

| Syntax | No.of bits | Mnemonic |
|---|---|---|
| PresetMatrixData()<br>{<br>    bsPresetMatrixType;<br>    for ( i=0; i<numObjects; i++ ) {<br>        numChannels = PresetMatrixType[bsPresetMatrixType];<br>        for ( j=0; j<numChannels; j++ ) {<br>            bsPresetMatrixElements[i][j];<br>        }<br>    }<br>} | 2<br><br><br><br>4 | uimsbf<br><br><br><br>uimsbf |

FIG. 12

| Syntax | No.of bits | Mnemonic |
|---|---|---|
| SAOCExtensionFrame(9)<br>{<br>    for ( i=0; i<bsNumPresets+1; i++ ) {<br>        if(bsPresetMatrix){<br>            for ( i=0; i<numObjects; i++ ) {<br>                for ( j=0; j<numChannels; i++ ) {<br>                      bsPresetMatrixElements[i][j];<br>                }<br>            }<br>        } else {<br>            PresetUserDataContainer(bsPresetUserDataIdentifier);<br>        }<br>    }<br>} | 4 | uimsbf |

METHOD AND AN APPARATUS FOR PROCESSING AN AUDIO SIGNAL

CROSS-REFERENCE TO RELATED APPLICATION

This application claims the benefit of U.S. Provisional Application No. 61/080,692, filed on Jul. 15, 2008, which is hereby incorporated by reference.

BACKGROUND OF THE INVENTION

1. Field of the Invention

The present invention relates to audio signal processing, and more particularly, to an apparatus for processing an audio signal and method thereof. Although the present invention is suitable for a wide scope of applications, it is particularly suitable for processing an audio signal received via a digital medium, a broadcast signal or the like.

2. Discussion of the Related Art

Generally, in a process for generating a downmix signal by downmixing an audio signal including a plurality of objects into a mono or stereo signal, parameters(or information) are extracted from the objects. Theses parameters(or information) are used in decoding the downmixed signal. And, positions and gains of the objects can be controlled by a selection made by a user as well as the parameters.

However, objects included in a downmix signal should be controlled by a user's selection. In case that a user controls an object, it is inconvenient for the user to directly control all object signals. And, it may be more difficult to reproduce an optimal state of an audio signal including a plurality of objects than a case that an expert controls objects.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a level and position of an object can be controlled using preset information including a preset rendering parameter and preset metadata.

Another object of the present invention is to provide an apparatus for processing an audio signal and method thereof, by which a level and position of an object can be controlled using external preset information included in a bitstream inputted separate from a downmix signal.

Another object of the present invention is to provide an apparatus for processing an audio signal and method thereof, by which an object included in a downmix signal can be controlled by applying external preset information carried on a bitstream inputted separate from the downmix signal to a whole downmix or a data region of the downmix signal using preset attribute information indicating an attribute of preset information inputted together with the downmix signal according to a characteristic of an audio source.

Another object of the present invention is to provide an apparatus for processing an audio signal and method thereof, by which a level and position of an object can be controlled using an external preset rendering parameter corresponding to one selected from a plurality of external preset metadatas displayed on a screen based on a selection made by a user.

A further object of the present invention is to provide an apparatus for processing an audio signal and method thereof, by which feedback information can be received from a user in a manner of displaying an object controlled by having an external preset rendering parameter applied thereto and selected external preset metadata on a screen.

To achieve there and other advantages and in accordance with the purpose of the preset invention, as embodied and broadly described, an apparatus for processing an audio signal comprises an information receiving unit receiving a downmix signal including at least one object and a plurality of preset informations to render at least one object being included in the downmix signal; an external preset information receiving unit receiving a plurality of external preset informations being inputted from external and applied object number information indicating the number of object being applied the external preset information; an external preset applying-determining unit determining whether the plurality of the external preset informations applies to the downmix signal based on the applied object number information; an external preset information selecting unit selecting one external preset information among the plurality of external preset informations, if the plurality of external preset informations is selected; and a rendering unit controlling the object by applying the external preset information to the all data regions, wherein the external preset information comprises external preset rendering parameter to render the downmix signal and external preset metadata indicating attribute of the external preset rendering parameter.

Preferably, the external preset applying-determining unit further uses external metadata information indicating whether the external preset information applies to the downmix signal.

Preferable, the external preset information receiving unit comprises external preset rendering parameter receiving unit receiving external preset rendering parameter as rendering data being inputted from external and external preset metadata receiving unit receiving external preset metadata indicating attribute of the external preset rendering parameter.

Preferably, an apparatus for processing an audio signal further comprises a display unit displaying the plurality of the external preset metadatas to select one external preset information among the plurality of external preset informations; and a preset information inputting unit being inputted a selection signal selecting one external preset metadata among the plurality of external preset metadatas, wherein the preset information selecting unit selects the one external preset information based on the selection signal.

Preferably, the display unit further displays the selected external preset metadata selecting based on the selection signal.

Preferably, the display unit comprises one or more graphical elements indicating level or position of the object.

Preferably, the graphical element is modified to indicate level or position of the object and activation.

Preferably, the display unit displays the plurality of external preset metadatas once, when the display unit operatively couples to the external preset information selecting unit.

Preferably, an apparatus for processing an audio signal further comprises an outputting unit outputting the modified object; and a storage unit storing the selected external preset information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10 to 12 are various diagrams for syntax related to preset invention according to another embodiment of the present invention;

DETAILED DESCRIPTION OF THE INVENTION

Reference will now be made in detail to the preferred embodiments of the present invention, examples of which are illustrated in the accompanying drawings. First of all, terminologies in the present invention can be construed as the following references. And, terminologies not disclosed in this specification can be construed as the following meanings and concepts matching the technical idea of the present invention. Therefore, the configuration implemented in the embodiment and drawings of this disclosure is just one most preferred embodiment of the present invention and fails to represent all technical ideas of the present invention. Thus, it is understood that various modifications/variations and equivalents can exist to replace them at the timing point of filing this application.

In this disclosure, 'information' is the terminology that generally includes values, parameters, coefficients, elements and the like and its meaning can be construed as different occasionally, by which the present invention is non-limited.

Figure 1A:
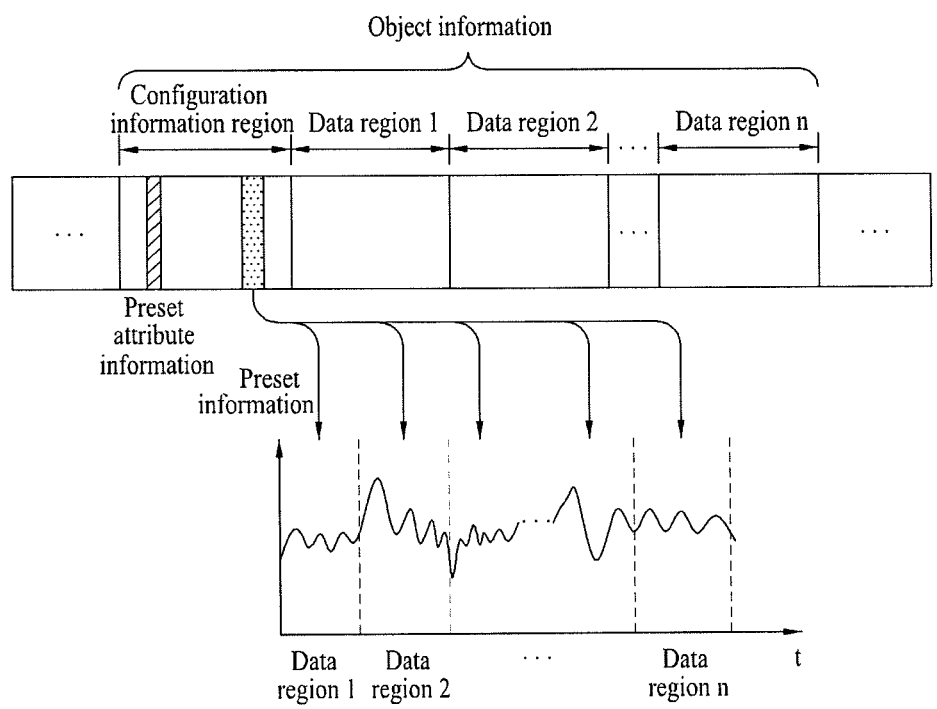
FIG. 1A and FIG. 1B are diagrams for a concept of adjusting an object included in a downmix signal by applying preset information according to preset attribute information according to one embodiment of the present invention.
Figure 1B:
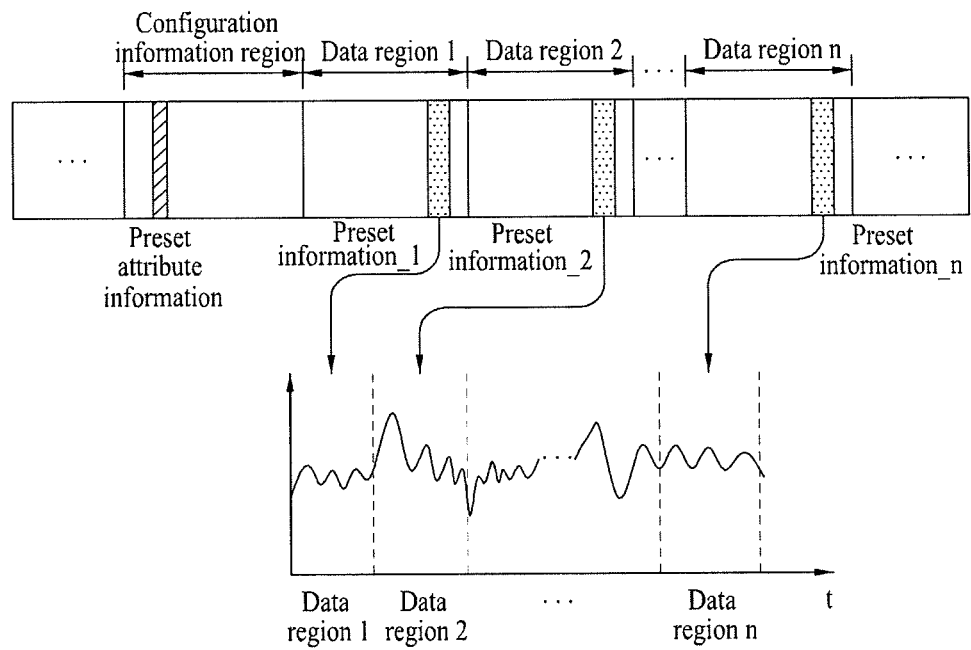

FIG. 1A and FIG. 1B are diagrams for a concept of adjusting an object included in a downmix signal by applying preset information according to preset attribute information according to one embodiment of the present invention. An audio signal of the present invention is encoded into a downmix signal and object information by an encoder. The downmix signal or the object information is transferred to a decoder by being carried on a single bitstream or an individual bitstream. The preset information is included in object information and indicates the information that was previously set to adjust a level, panning or the like of an object included in a downmix signal. The preset information can include various modes and is able to include rendering parameters for actually adjusting an object and metadatas indicating a characteristic of a corresponding mode. This will be explained in detail with reference to FIG. 2 and FIG. 3 later.

Referring to FIG. 1A and FIG. 1B, object information included in a bitstream particularly includes a configuration information region and a plurality of data regions (data region 1, data region 2, ... data region n). The configuration information region is a region located at a fore part of a bitstream of object information and contains informations applied in common to all data regions of the object information. For instance, the configuration region information can contain configuration information including a tree structure and the like, data region length information, object number information and the like.

On the contrary, the data region is a unit generated from dividing a time domain of a whole audio signal based on the data region length information contained in the configuration information region and is able to include a frame. The data region of the object information corresponds to a data region of the downmix signal and contains such object data information as object level information based on the attribute of the object of the corresponding data region, object gain information and the like.

In an audio signal processing method according to one embodiment of the present invention, preset attribute information (preset_attribute_information) is read from object information of a bitstream. The preset attribute information indicates that preset information is included in which region of a bitstream. In particular, the preset attribute information indicates whether preset information is included in a configuration information region of the object information or a data region of the object information and its detailed meanings are shown in Table 1.

TABLE 1

| Preset attribute information (preset_attribute_information) | Meaning |
| --- | --- |
| 0 | Preset information is included in a configuration information region. |
| 1 | Preset information is included in a data region. |

Referring to FIG. 1A, if preset attribute information is set to 0 to indicate that preset information is included in a configuration information region, rendering is performed in a manner that preset information extracted from the configuration information region is equally applied to all data regions of a downmix signal.

On the contrary, referring to FIG. 1B, if preset attribute information is set to 1 to indicate that preset information is included in a data region, rendering is performed in a manner that preset information extracted from the data region is equally applied to a corresponding data region of a downmix signal. For instance, preset information extracted from a data region 1 is applied to a downmix signal of the data region 1. And, preset information extracted from a data region n is applied to a downmix signal of the data region n.

Moreover, the preset attribute information is able to indicate whether the preset information is static or dynamic. When preset attribute information is set to 0, if preset information is included in a configuration information region, it is able to call that the preset information is static. In this case, the preset information is statically and equally applied to all data regions.

On the contrary, when preset attribute information is set to 1, if preset information is included in a data region, it is able to call that the preset information is dynamic. In this case, since the preset information is applied to a corresponding data region only to render a downmix signal of the corresponding data region, the preset information is dynamically applied per data region. In this case, if the preset information is dynamic, it is preferable that the preset information exists in an extension region of the data region. If the preset information is static, it is preferable that the preset information exists in an extension region of the configuration information region.

Therefore, an audio signal processing method according to one embodiment of the present invention is able to render a downmix signal in a manner of using preset information suitable for each data region according to a characteristic of an audio source by preset attribute information or applying the same preset information to all data regions.

Figure 2:
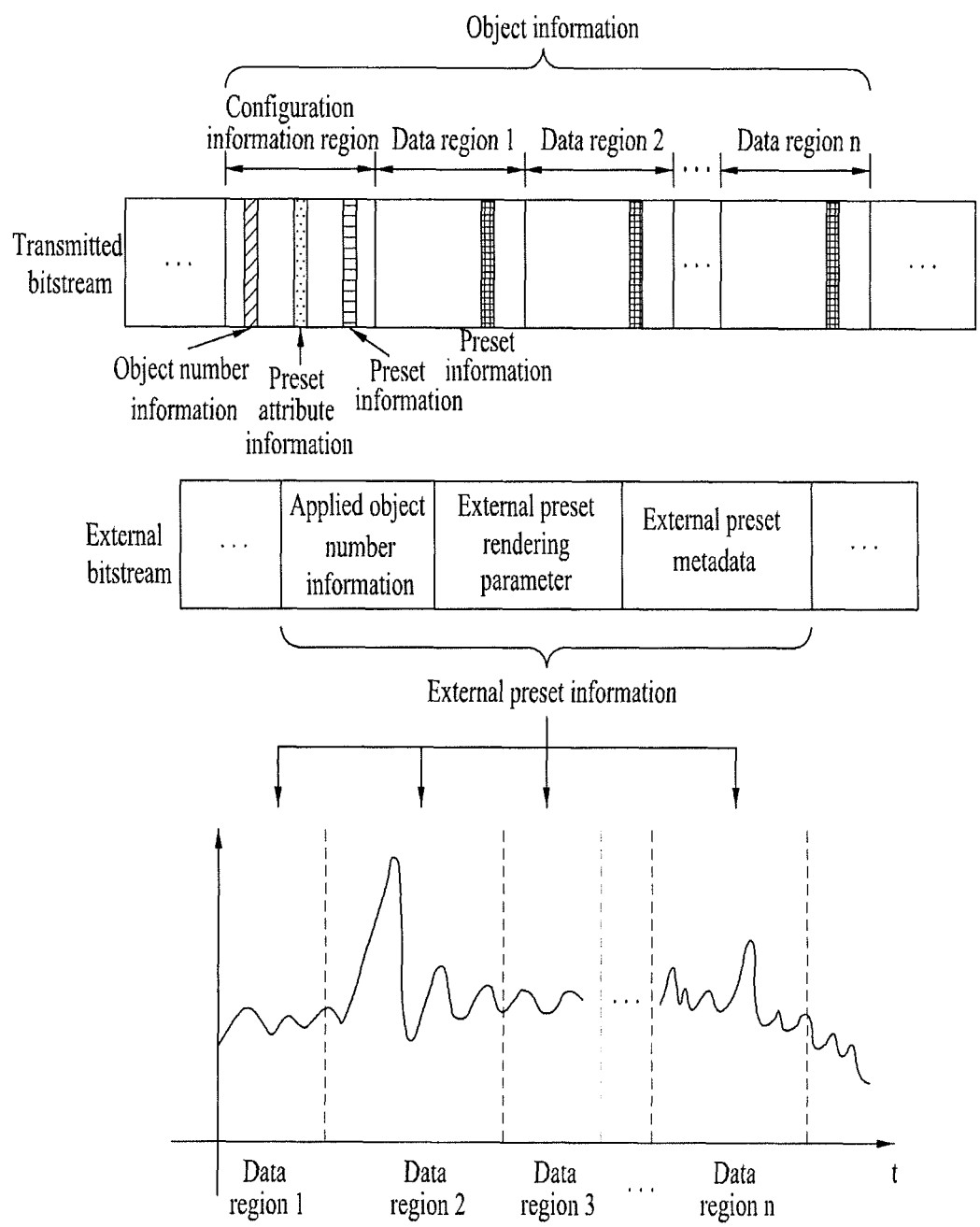
FIG. 2 is a diagram for a concept of adjusting an object included in a downmix signal using external preset information according to preset attribute information according to one embodiment of the present invention.

FIG. 2 is a diagram for a concept of adjusting an object included in a downmix signal using external preset information according to preset attribute information according to one embodiment of the present invention.

First of all, an audio signal of the present invention is encoded into a downmix signal and object information. As mentioned in the foregoing description with reference to FIG. 1A and FIG. 1B, the downmix signal and the object information are transferred as one bitstream or individual bitstreams to a decoder. In this case, the object information of the transferred bitstream can further include object number information indicating the number of object included in the downmix signal as well as preset attribute information and preset information.

Meanwhile, external preset information is externally inputted as an external bitstream to the decoder(not from the encoder) as well as the preset information included in the object information transferred from the encoder to render the downmix signal. As a set of information previously set to adjust the object, preset information inputted not from the encoder but from an external environment is named external preset information in this disclosure. The external preset information included in the external bitstream can include an external preset rendering parameter for adjusting a gain and/or panning of an object and external preset parameter indicating an attribute of the external preset rendering parameter. Moreover, the external bitstream can further include applied object number information indicating the number of objects included in the downmix signal, to which the external preset information will be applied, and external metadata information indicating whether the external preset information is used or not.

It is able to determine whether the external preset information or the preset information will be used using the object number information and the applied object number information. This will be explained in detail with reference to FIG. 4 later. If it is determined to use the external preset information, the object can be adjusted in a manner that the external preset information is equally and statically applied to all data regions of the downmix signal.

Figure 3:
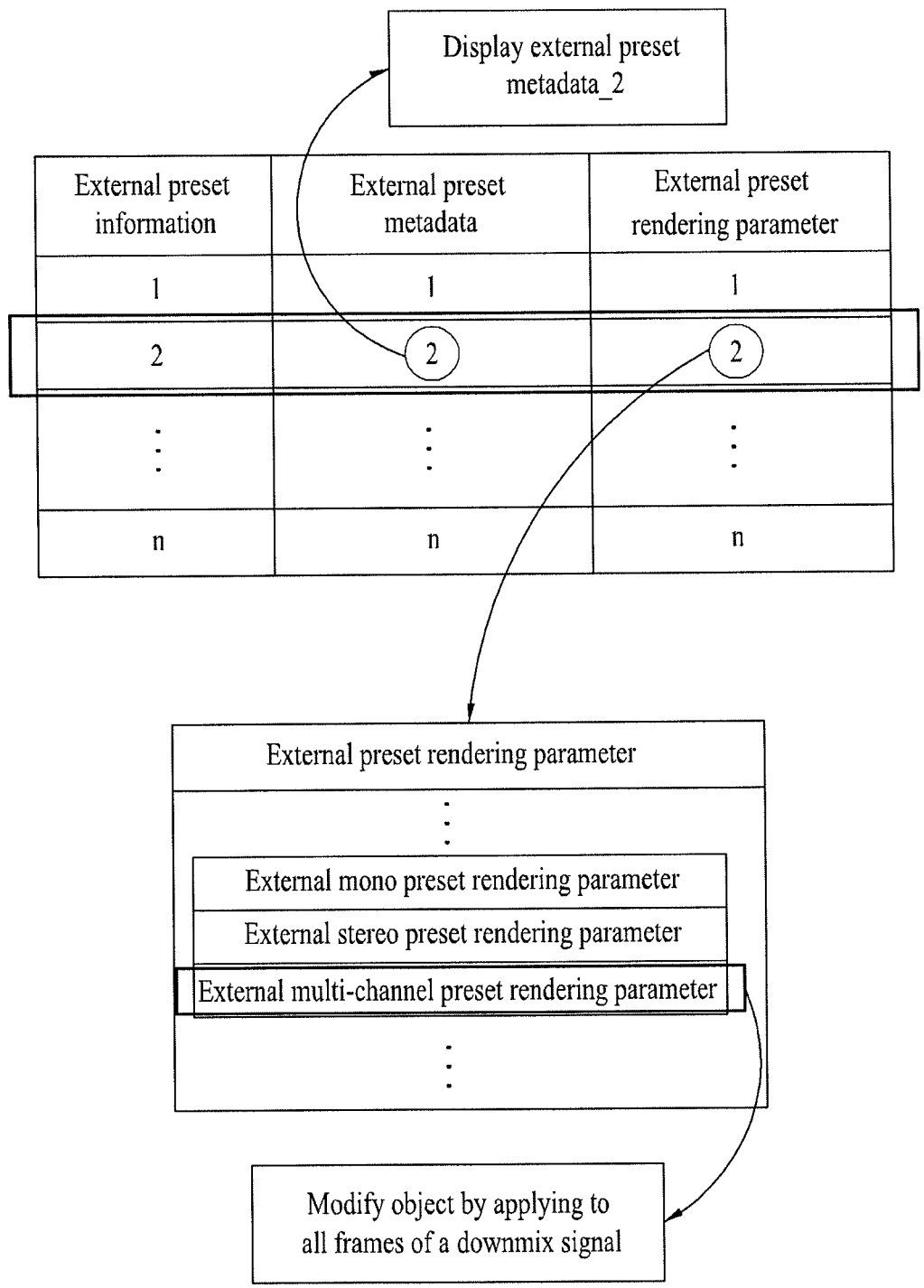
FIG. 3 is a diagram for a concept of external preset information applied to an object included in a downmix signal.

FIG. 3 is a diagram for a concept of external preset information applied to an object included in a downmix signal.

First of all, the external preset information can be represented in various modes that can be selected according to a characteristic of an audio signal or a listening environment. And, there can exist at least one external preset information. Moreover, the external preset information can include an external preset rendering parameter applied to adjust the object and external preset metadata to represent an attribute of the external preset rendering parameter and the like. It is able to represent the external preset metadata in a text form. The external preset metadata can indicate an attribute of the external preset information as well as an attribute (e.g., a concert hall mode, a karaoke mode, a news mode, etc.) of the external preset rendering parameter.

The external preset metadata can include such relevant information for representing the external preset rendering parameter as a writer of the external preset rendering parameter, a written date of the external preset rendering parameter, a name of an object having the external preset rendering parameter applied thereto and the like, file extension information indicating a file format of preset information and the like. Meanwhile, the external preset rendering parameter is the data that is substantially applied to the object and can be represented in various forms (e.g., matrix) to correspond to the external preset metadata.

Referring to FIG. 3, external preset information 1 may correspond to a concert hall mode for providing a sound stage effect that enables a listener to hear a music signal as if the listener is in a concert hall. External preset information 2 can be a karaoke mode for reducing a level of a vocal object in an audio signal. And, external preset information n can be a news mode for raising a level of a speech object. Moreover, the external preset information includes external preset metadata and an external preset rendering parameter. If a user selects the external preset information 2, the karaoke mode corresponding to the external preset metadata 2 will be displayed on a display unit. And, it is able to adjust a level by applying the external preset information 2 relevant to the external preset metadata 2 to the object.

In this case, the external preset rendering parameter can include a mono external preset rendering parameter, a stereo external preset rendering parameter and a multi-channel external preset rendering parameter. The external preset rendering parameter is determined according to a final output channel of an object (or, a final output channel of a downmix signal including an object). The mono external preset rendering parameter is the external preset rendering parameter applied if an output channel of the object is mono. The stereo external preset rendering parameter is the external preset rendering parameter applied if an output channel of the object is stereo. And, the multi-channel external preset rendering parameter is the external preset rendering parameter applied if an output channel of the object is a multi-channel. Once an output channel of the object is determined according to configuration information, a type of the external preset rendering parameter is determined using the determined output channel. It is then able to adjust an object included in the downmix signal by applying the external preset rendering parameter to all data regions.

Figure 4:
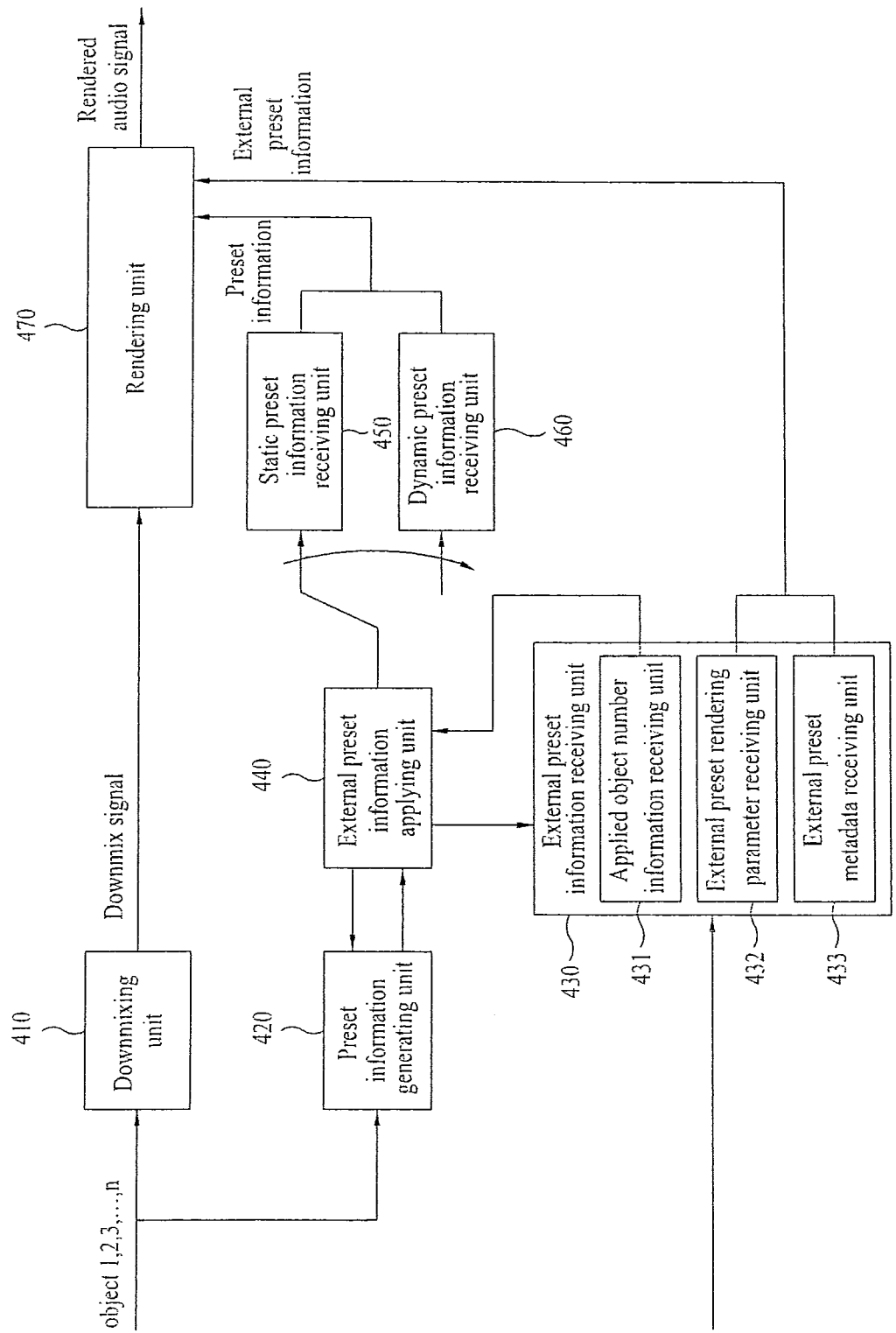
FIG. 4 is a block diagram of an audio signal processing apparatus according to one embodiment of the present invention.

FIG. 4 is a block diagram of an audio signal processing apparatus 400 according to one embodiment of the present invention.

Referring to FIG. 4, an audio signal processing apparatus 400 can include a downmixing unit 410, a preset information generating unit 420, an external preset information receiving unit 430, an external preset information applying-determining unit 440, a static preset information receiving unit 450, a dynamic preset information receiving unit 460 and a rendering unit 470.

The downmixing unit 410 receives at least one or more objects object 1, object 2, object 3, . . . , object n and then generates a downmix signal by downmixing the received at least one or more objects. In this case, the object means a source and can include vocal, guitar, piano or the like. The number of channels of the downmix signal is smaller than that of inputted signals. And, the downmix signal can include all of the objects.

The preset information generating unit 420 generates preset information for adjusting an object included in an audio signal in case of rendering and is able to generate a preset rendering parameter, preset information and preset attribute information indicating an attribute of the preset information. The preset information generating unit 420 can include a preset attribute determining unit, a preset rendering parameter generating unit and a preset metadata generating unit. This will be explained with reference to FIG. 13 later.

The external preset information receiving unit 430 receives external preset information inputted from an external environment of the audio signal processing apparatus 400 according to one embodiment of the present invention. The external preset information includes a plurality of external preset rendering parameters and a plurality of external preset metadatas corresponding to the external preset rendering parameters and is also able to include applied object number information indicating the number of objects to which the external preset rendering parameters are applied. A bitstream structure of the external preset information according to one embodiment of the present invention will be explained with reference to FIG. 9 later.

The external preset information applying-determining unit 440 receives the preset information inputted from the preset information generating unit 420 and the external preset information inputted from the external preset information receiving unit 430 and then determines whether to apply the external preset information. First of all, the external preset information applying-determining unit 440 receives applied object number information indicating the number of objects, to which the external preset information will be applied, from the applied object number information receiving unit 431 included in the external preset information receiving unit 430. If the applied object number information is equal to the object number information included in the preset information through comparison, it is able to determine to use the external preset information preferentially.

If the applied object number information is different from the object number information, it is determined whether the preset information is included in a configuration information region of a bitstream or a data region thereof by extracting preset attribute information indicating an attribute of the preset information inputted from the preset information generating unit 420. Preferably, the preset attribute information is used to determine whether the presser information is included in an extension region of the configuration information of the bitstream or an extension region of the data region [not shown in the drawing]. In this case, if it is determined that the preset information is included in the configuration information region of the bitstream, the static preset information receiving unit 450 is activated. If it is determined that the preset information is included in the data region of the bitstream, the dynamic preset information receiving unit 460 is activated.

Based on the preset attribute information, if the static preset information receiving unit 450 is activated (the case of preset_attribute_information=0 in Table 1), the preset information is inputted to the activated static preset information receiving unit 450 to operate. The static preset information receiving unit 450 can include a static preset metadata receiving unit receiving preset metadata corresponding to all data regions and a static preset information receiving unit receiving preset information. This will be explained in detail with reference to FIG. 13 later.

The dynamic preset information receiving unit 460 is activated if the preset attribute information indicates that the preset information is included in the data region (the case of preset_attribute_flag=1 in Table 1). The dynamic preset information receiving unit 460 is able to include a dynamic preset metadata receiving unit receiving preset metadata corresponding to the corresponding data region and a dynamic preset information receiving unit receiving preset information per data region. The dynamic preset metadata receiving unit receives and outputs selected preset metadata and the dynamic preset information receiving unit receives the preset information. This will be explained in detail with reference to FIG. 11 later.

The rendering unit 470 receives the downmix signal generated from downmixing the audio signal including a plurality of objects and the preset rendering parameter outputted from the static preset information receiving unit 450 or the dynamic preset information receiving unit 460. Meanwhile, if the external preset information applying-determining unit 440 determines that the external preset information is applied, the rendering unit 470 receives an input of the external preset rendering parameter from the external preset rendering parameter receiving unit 432. The preset information or the external preset rendering parameter is applied to the object included in the downmix signal, whereby a level or position of the object can be adjusted.

If the audio signal processing apparatus 400 includes a display unit [not shown in the drawing], the selected preset metadata outputted from the dynamic preset metadata receiving unit, the selected preset metadata outputted from the static preset metadata receiving unit or the selected external preset metadata outputted from the external preset metadata receiving unit 433 can be displayed on a screen of the display unit.

Figure 5A:
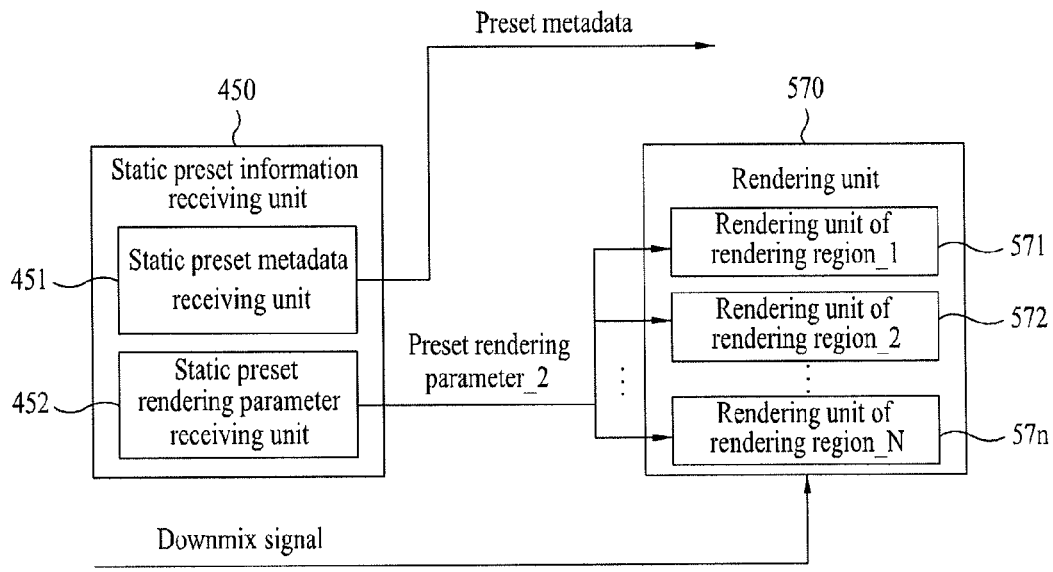
FIG. 5A and FIG. 5B are block diagrams for schematic configurations of a static preset information receiving unit, a dynamic preset information receiving unit and a rendering unit according to one embodiment of the present invention.
Figure 5B:
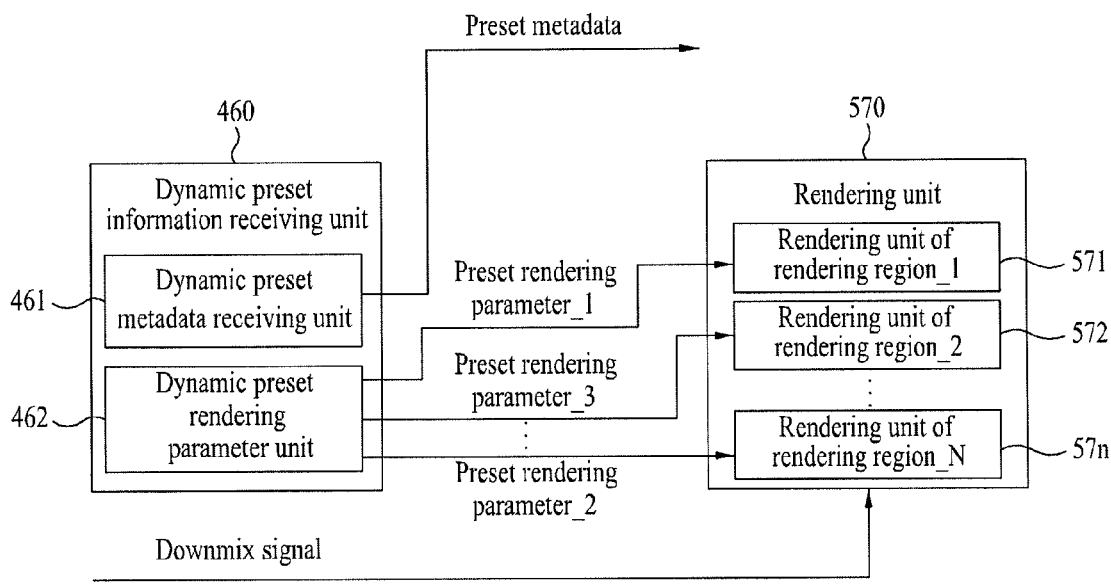

FIG. 5A and FIG. 5B are block diagrams for a method of applying preset information to a rendering unit according to an embodiment of the present invention. First of all, FIG. 5A shows a method of applying preset information outputted from a static preset information receiving unit 450 to a rendering unit 570. In this case, the static preset information receiving unit 450 is identical to the former static preset information receiving unit 450 shown in FIG. 4 and includes a static preset metadata receiving unit 451 and a static preset rendering parameter receiving unit 452.

The static preset rendering parameter receiving unit 452 receives a preset rendering parameter for adjusting an object by being applied to all data regions of a downmix signal. In this case, the preset rendering parameter can include a rendering parameter included in one preset information selected from a plurality of preset informations. On the contrary, the static preset metadata receiving unit 451 receives preset metadata which indicates an attribute of the preset rendering parameter by corresponding to the one preset rendering parameter.

The static preset information receiving unit 450 receives and outputs the preset metadata and the preset rendering parameter corresponding to all data regions. And, the rendering unit 570 receives the preset rendering parameter.

The rendering unit 570 performs rendering per data region by receiving a downmix signal as well as the preset rendering parameter. The rendering unit 570 includes a data region 1 rendering unit 571, a data region 2 rendering unit 572, ... and a data region n rendering unit 57n. In this case, rendering is performed in a manner that all data region rendering units 54X of the rendering unit 570 equally apply the received preset rendering parameter to the downmix signal. For instance, if a preset rendering parameter outputted from the static preset rendering parameter receiving unit 452 is an external reset rendering parameter 2 indicating a karaoke mode, it is able to apply the karaoke mode to all data regions ranging from a first data region to an $n^{th}$ data region.

FIG. 5B shows a method of applying preset information outputted from a dynamic preset information receiving unit 460 to a rendering unit 570. The dynamic preset information receiving unit 460 is identical to the former dynamic preset information receiving unit 460 shown in FIG. 4 and includes a dynamic preset metadata receiving unit 461 and a dynamic preset rendering parameter receiving unit 462.

The dynamic preset information receiving unit 460 receives a preset rendering parameter from the dynamic preset rendering parameter per data region. The dynamic preset information receiving unit 460 receives and outputs preset metadata from the dynamic preset metadata receiving unit 461. The preset rendering parameter is then inputted to the rendering unit 570.

The rendering unit 570 performs rendering per data region by receiving a downmix signal as well as the preset rendering parameter. The rendering unit 570 includes a data region 1 rendering unit 571, a data region 2 rendering unit 572, ... and a data region n rendering unit 57n. In this case, each data region rendering units 54X of the rendering unit 570 performs rendering by receiving and applying a preset rendering parameter corresponding to each data region to the downmix signal.

For instance, preset information_1 of a concert hall mode is applied to a first data region. Preset information_3 of a classic mode is applied to a second data region. Preset information_2 of a karaoke mode can be applied to a sixth data region. In this case, 'n' of the preset information_n indicates an index of an external preset mode. And, it is understood that preset metadata corresponding to each preset rendering parameter is outputted per data region.

Figure 6:
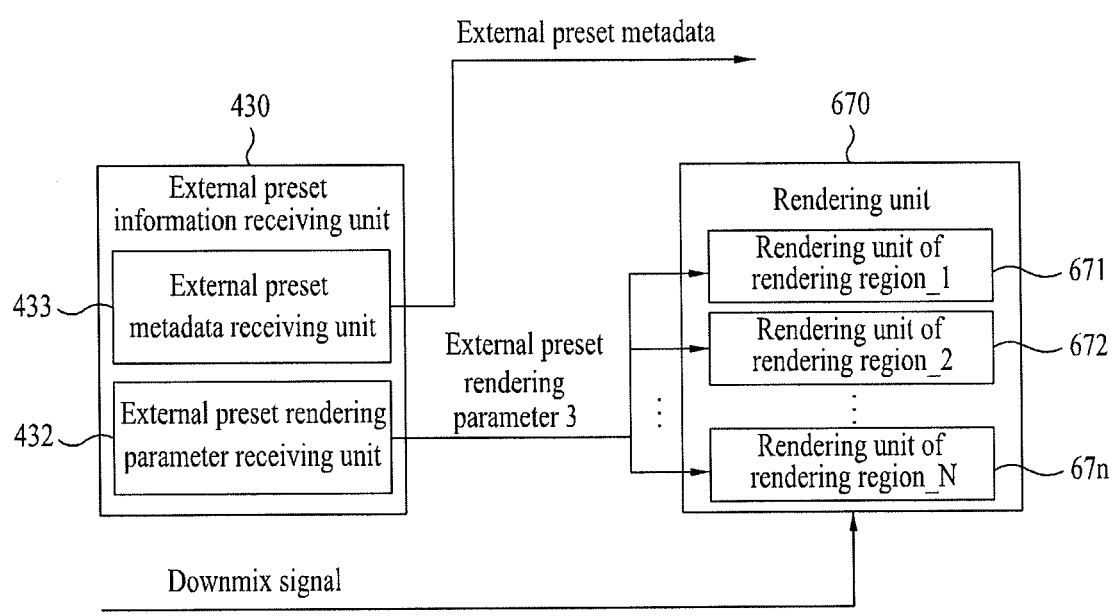
FIG. 6 is a block diagram for a schematic configuration of an external preset information receiving unit and a rendering unit according to one embodiment of the present invention.

FIG. 6 is a block diagram for a method of applying external preset information to a rendering unit according to an embodiment of the present invention. First of all, an external preset information receiving unit 430 is identical to the former external preset information receiving unit 430 shown in FIG. 4 and includes an external preset metadata receiving unit 433 and an external preset rendering parameter receiving unit 432.

The external preset rendering parameter receiving unit 432 receives a preset rendering parameter for adjusting an object by being applied to all data regions of a downmix signal. In this case, the external preset rendering parameter can include a rendering parameter included in one external preset information selected from a plurality of external preset informations. On the contrary, the external preset metadata receiving unit 433 receives external preset metadata which indicates an attribute of the external preset rendering parameter by corresponding to the one external preset rendering parameter.

The external preset information receiving unit 430 receives and outputs the external preset metadata and the external preset rendering parameter corresponding to all data regions. And, the rendering unit 670 receives the external preset rendering parameter.

The rendering unit 670 performs rendering per data region by receiving a downmix signal as well as the external preset rendering parameter. The rendering unit 670 includes a data region 1 rendering unit 671, a data region 2 rendering unit 672, ... and a data region n rendering unit 67n. In this case, rendering is performed in a manner that all data region rendering units 64X of the rendering unit 670 equally apply the received external preset rendering parameter to the downmix signal. For instance, if an external preset rendering parameter outputted from the external preset rendering parameter receiving unit 432 is an external reset rendering parameter 3 indicating a classic mode, it is able to apply the karaoke mode to all data regions ranging from a first data region to an $n^{th}$ data region.

Figure 7:
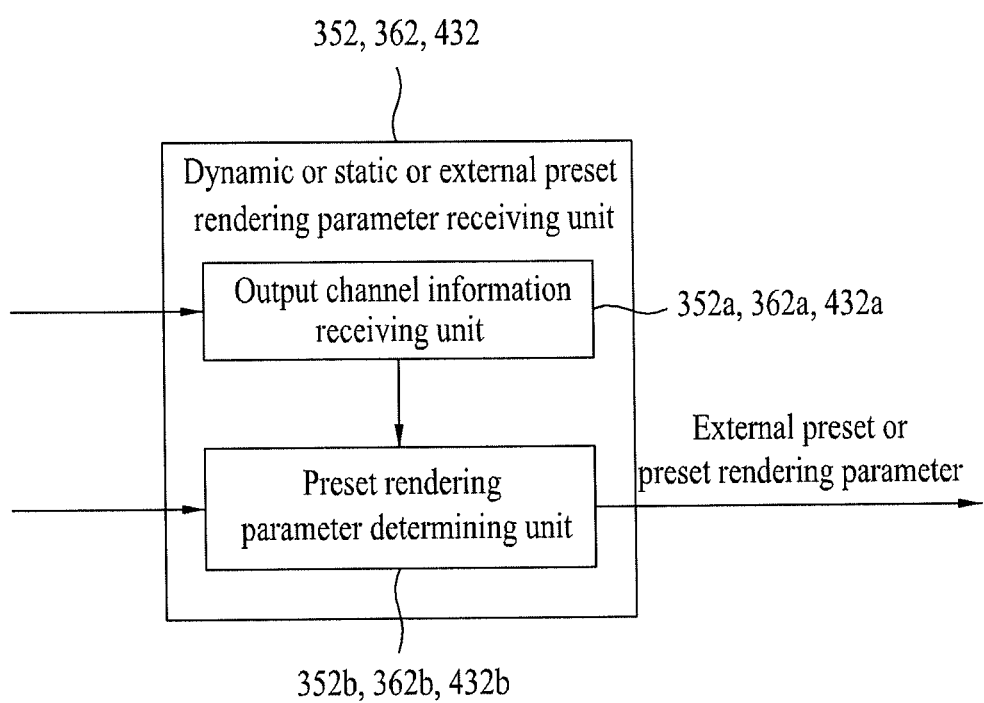
FIG. 7 is a block diagram for a schematic configuration of a preset rendering parameter receiving unit shown in one of FIGS. 5A to 6.

FIG. 7 is a block diagram for a schematic configuration of a static preset rendering parameter receiving unit 452 included in a static preset information receiving unit 450 of an audio signal processing apparatus 400, a dynamic preset rendering parameter receiving unit 462 included in a dynamic preset information receiving unit 460 or an external preset rendering parameter receiving unit 432 included in an external preset information receiving unit 430.

The dynamic/static/external preset rendering parameter receiving unit 452/462/432 includes an output channel information receiving unit 452a/462a/432a and a preset rendering parameter determining unit 452b/462b/432b. The output channel information receiving unit 452a/462a/432a receives and outputs output channel number information indicating the number of output channels from which an object included in a downmix signal will be outputted. In this case, the output channel number information may indicate a mono channel, a stereo channel or a multi-channel (5.1 channel), by which the present invention is non-limited.

The preset rendering parameter determining unit 452b/462b/432b receives and outputs a corresponding preset rendering parameter or a corresponding external preset rendering parameter based on the output channel number information inputted from the output channel information receiving unit 452a/462a/432a. In this case, the external preset rendering parameter may include one of a mono external preset rendering parameter, a stereo external preset rendering parameter, and a multi-channel external preset rendering parameter. And, the preset rendering parameter may include one of a mono preset rendering parameter, a stereo preset rendering parameter, and a multi-channel preset rendering parameter. In case that the preset rendering parameter or the external preset rendering parameter is a matrix type, its dimension can be determined based on the number of objects and the number of output channels. And, the preset matrix or the external preset matrix can have a form of (No. of objects) *(No. of output channels). For instance, when there are n objects included in a downmix signal, if the output channels from the output channel information receiving unit 452a/462a/432a correspond to the 5.1 channel (i.e., 6 channels), the preset rendering parameter determining unit 452b/462b/432b can output a multi-channel preset rendering parameter or a multi-channel external preset rendering parameter implemented in form of n*6. In this case, an element of the matrix is a gain value that indicates an extent that an $a^{th}$ object is included in an $i^{th}$ channel.

Figure 8:
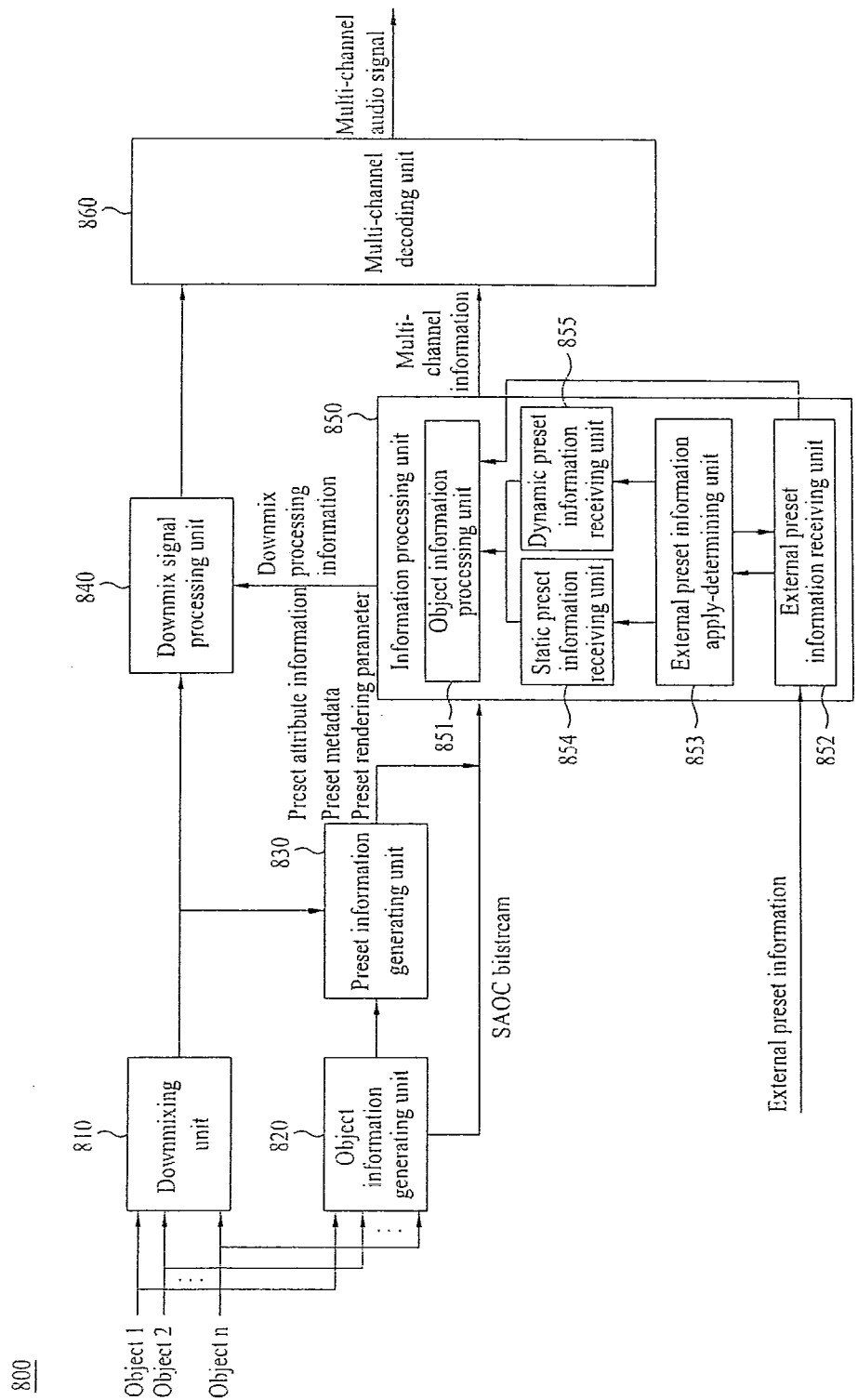
FIG. 8 is a block diagram of an audio signal processing apparatus according to one embodiment of the present invention.

FIG. 8 is a block diagram of an audio signal processing apparatus 800 according to another embodiment of the present invention. Referring to FIG. 8, an audio signal processing apparatus 800 mainly includes a downmixing unit 810, an object information generating unit 820, a preset information generating unit 830, a downmix signal processing unit 840, an information processing unit 850 and a multi-channel decoding unit 860.

A plurality of objects (object 1, object 2, . . . object n) are inputted to the downmixing unit 810 to generate a mono or a stereo downmix signal. Moreover, a plurality of the objects are inputted to the object information generating unit 820 to generate object level information indicating a level of object and a gain value of object included in a downmix signal. In case of a stereo downmix signal, the object information generating unit 820 generates object gain information indicating an extent of object included in a downmix channel, object correlation information indicating a presence or non-presence of correlation between objects and the like. Subsequently, the downmix signal and the object information are inputted to the preset information generating unit 830. The preset information generating unit 830 then generates preset attribute information indicating whether the preset information is included in a data region of a bitstream or a configuration information region of the bitstream and preset information including a preset rendering parameter previously set to perform rendering to adjust a level or position of object and preset metadata for representing the preset rendering parameter. As mentioned in the foregoing description of the audio signal processing apparatus and method shown in FIGS. 1 to 4, the process for generating the preset attribute information, the preset rendering parameter and the preset metadata follows the same description thereof.

Moreover, the preset information generating unit 830 is able to further generate preset presence information indicating whether preset information exists in a bitstream, preset number information indicating the number of preset informations, and preset metadata length information indicating a length of preset metadata. The object information generated by the object information generating unit 820 and the preset attribute information, preset information, preset metadata, preset presence information, preset number information and preset metadata length information generated by the preset information generating unit 830 can be transferred by being included in a SAOC bitstream or can be transferred in form of one bitstream in which a downmix signal is included as well. In this case, the bitstream including the downmix signal and the preset relevant informations can be inputted to a signal receiving unit (not shown in the drawing) of a decoding apparatus.

The information processing unit 850 includes an object information processing unit 851, an external preset information receiving unit 852, an external preset information application determining unit 853, a static preset information receiving unit 852 and a dynamic preset information receiving unit 853 and receives the SAOC bitstream. As mentioned in the foregoing description with reference to FIGS. 1 to 7, whether the static preset information receiving unit 852 or the dynamic preset information receiving unit 853 is activated is determined based on the preset attribute information included in the SAOC bitstream.

The external preset information receiving unit 852 receives external preset information inputted from an external environment of the audio signal processing apparatus 800 according to one embodiment of the present invention. The received external preset information is inputted to the external preset information application determining unit 853 to determine whether the external preset information will be used to adjust an object.

In case of using the external preset information, the external preset information received by the external preset information receiving unit 852 is directly inputted to the object information processing unit 851. On the contrary, in case of using the preset information included in the SAOC bitstream, the preset information is inputted to the static preset information receiving unit 854 or the dynamic preset information receiving unit 855 based on the preset attribute information included in the SAOC bitstream.

The static preset information receiving unit 854 or the dynamic preset information receiving unit 855 receives the above described preset attribute information via the SAOC bitstream. And, the external preset information receiving unit 852 receives the external preset presence information, the external preset number information, the external preset metadata, the output channel information and the external preset rendering parameter (e.g., external preset matrix). And, methods according to the various embodiments described in the audio signal processing method and apparatus shown in FIGS. 1 to 7 are used.

The static preset information receiving unit 854, the dynamic preset information receiving unit 855 or the external preset information receiving unit 852 outputs the preset metadata and preset rendering data received via the SAOC bitstream or the external preset metadata and the external preset information received via the external bitstream. The object information processing unit 851 then receives the outputted data and information to generate downmix processing information for pre-processing a downmix signal and multi-channel information for upmixing the pre-processed downmix signal using the downmix processing unit in a manner of using the outputted data and information together with the object information included in the SAOC bitstream.

In doing so, the preset rendering parameter and preset metadata outputted from the static preset information receiving unit 854 and the external preset rendering parameter and external preset metadata outputted from the external preset information receiving unit 852 correspond to all data regions. And, the preset information and preset metadata outputted from the dynamic preset information receiving unit 855 correspond to one of the data regions.

Subsequently, the downmix processing information is inputted to the downmix signal processing unit 840 to vary a channel in which an object contained in the downmix signal is included. Therefore, it is able to perform panning. Thus, the pre-processed downmix signal is inputted to the multi-channel decoding unit 860 together with the multi-channel information outputted from the information processing unit 850. It is then able to generate a multi-channel audio signal by upmixing the inputted the pre-processed downmix signal and the multi-channel information together.

In decoding a downmix signal including a plurality of objects into a multi-channel signal using multi-channel information, an audio signal processing apparatus according to another embodiment of the present invention is facilitated to adjust a level of object using external preset rendering parameter and external preset metadata separately inputted as a bitstream from an external environment.

Figure 9:
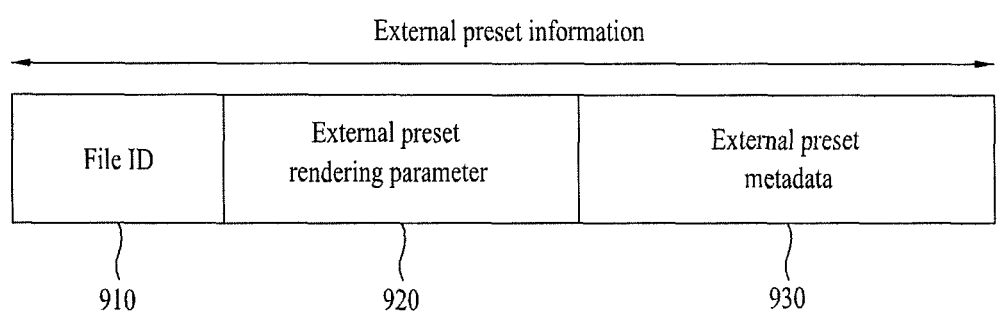
FIG. 9 is a diagram for a bitstream structure of external preset information.

FIG. 9 is a diagram for a bitstream structure of external preset information according to one embodiment of the present invention.

Referring to FIG. 9, for compatibility with an SAOC bitstream, external preset information includes a file ID 910, an external preset rendering parameter 920 and an external preset metadata 930.

In order to determine whether external preset information can be applied to a downmix signal, i.e., whether synchronization with an SAOC bitstream is possible, the file ID 910 can include object number information indicating the number of objects to which the external preset information is applied. Moreover, the file ID 910 can include a sync word separately defined for synchronization, can further include external preset number information indicating the number of external preset informations, and can include an identifier set to enable external preset information to be preferentially used irrespective of the applied object number.

The external preset rendering parameter 920 can contain such a content as a preset rendering parameter included in the SAOC bitstream and is able to include the various external preset rendering parameters described with reference to FIG. 3. The external preset rendering parameter 920 can include rendering data of a user setting type as well as a matrix type rendering parameter. And, the external preset rendering parameter 920 can further include output channel information indicating the number of external preset informations and the number of output channels.

Meanwhile, the external preset metadata 930 includes metadata corresponding to the external preset rendering parameter 920.

FIGS. 10 to 12 are various diagrams for syntax related to preset invention according to another embodiment of the present invention.

Referring to FIG. 10, it is able to configure preset information to be included in an extension region of configuration information.

A configuration information region SAOCSpecificConfig( ) of a bitstream has an extension region SAOCExtensionConfig( ). If preset information is received, it can be indicated by a container type of SAOCExtensionConfig(9) and its meaning is disclosed in Table 2. In FIG. 10, an extension region of the SAOCExtensionConfig(9) includes preset information PresetConfig( ).

TABLE 2

| SAOCExtensionConfig( ) | Meaning |
|---|---|
| SAOCExtensionConfig(9) | Indicating that preset information is included in an extension region of configuration information |

The preset information PresetConfig( ), as shown in FIG. 10, can include preset number information bsNumPresets indicating the number of preset informations, preset metadata length information bsNumCharPresetLabel [i] indicating the number of bytes for representing preset metadata indicating an attribute of the preset information, and a matrix type preset rendering parameter bsPresetMatrix indicating the preset metadata bsPresetLabel [i] [j] and rendering data.

Thus, it is facilitated to play back an audio signal by rendering the audio signal using preset information included in a configuration information region of a bitstream.

On the other hand, referring to FIG. 11, the preset information can be included in an extension region of a data region instead of a configuration information region. A data region SAOCFrame( ) has an extension region SAOCExtensionFrame( ). And extension region SAOCExtensionFrame(9) for preset information can include such preset information as the preset information PresetConfig( ) shown in FIG. 8. And, the meaning of the extension region of the data region is disclosed in Table 3.

In case that the aforesaid external preset information described with reference to FIGS. 1 to 9 is used, corresponding informations included in the external preset information are extracted instead of the preset information PresetConfig( ) shown in FIG. 10 or FIG. 11 and can be used to adjust an object included in a downmix signal.

TABLE 3

| SAOCExtensionFrame( ) | Meaning |
|---|---|
| SAOCExtensionFrame(9) | Indicating that preset information is included in an extension region of a data region |

Meanwhile, the extension region of the data region in FIG. 11 can include information, which needs to be updated per data region, such as a preset rendering parameter and the like, as shown in the SAOCExtensionFrame( ) syntax. In this case, a preset rendering parameter PresetMatrixDate( ), which is substantial rendering data, includes values, which are not updated, such as a rendering parameter type bsPresetMatrixType indicating a type of the preset rendering parameter.

Hence, FIG. 12 proposes a syntax according to a further embodiment of the present invention. Referring to FIG. 12, an extension region SAOCExtensionFrame(9) of a data region includes a preset rendering parameter bsPresetMatrixElements [i] [j] only.

Thus, an audio signal processing method according to one embodiment of the present invention enables non-updated informations to be included in a configuration information region, thereby reducing the number of bits transported for preset information.

Figure 13:
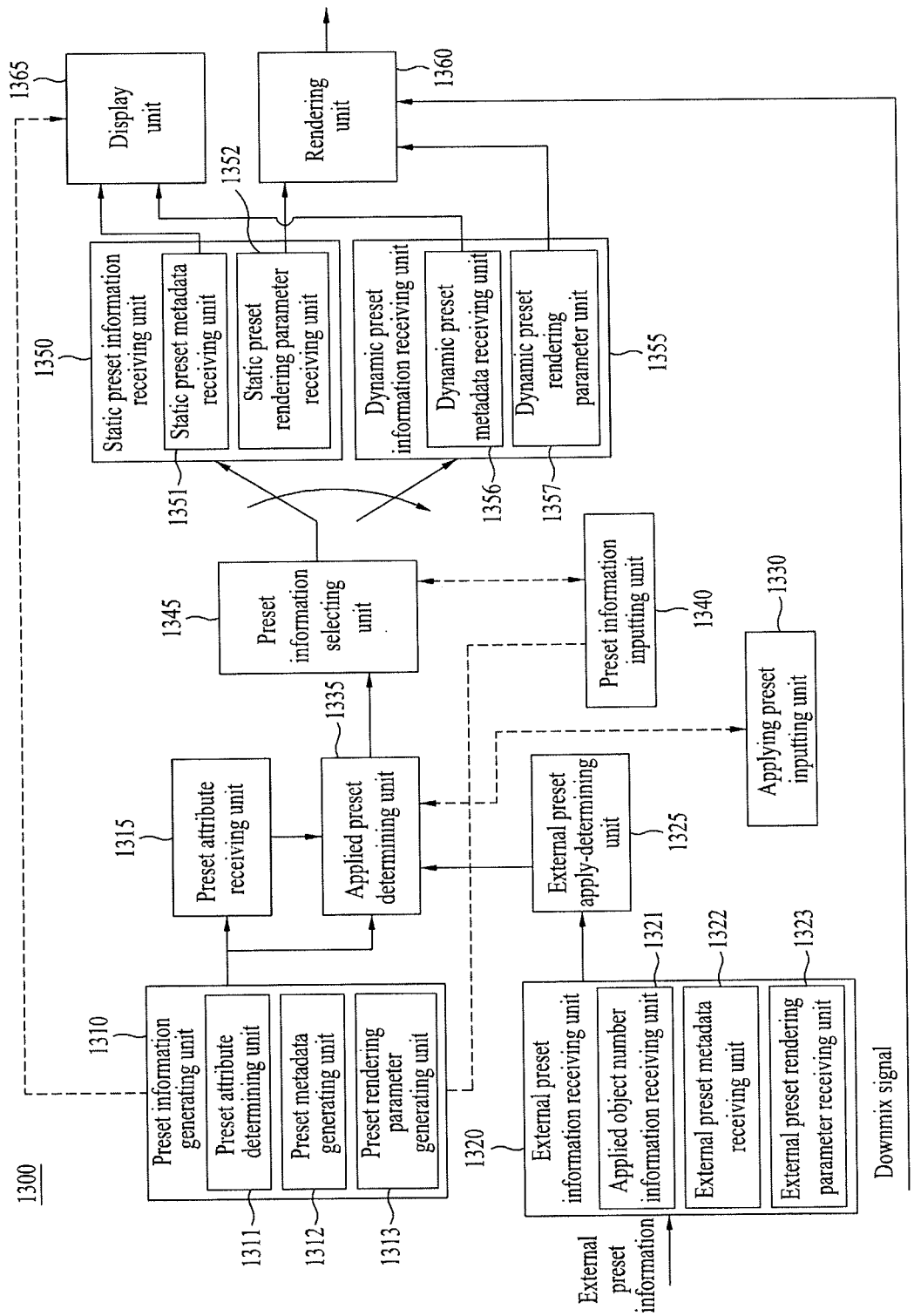
FIG. 13 is a block diagram of an audio signal processing apparatus according to another embodiment of the present invention.

FIG. 13 is a block diagram of an audio signal processing apparatus according to a further embodiment of the present invention. First of all, an audio signal processing apparatus 1300 mainly includes a preset information generating unit 1310, a preset attribute receiving unit 1315, an external preset information receiving unit 1320, an external preset applicability determining unit 1325, an applied preset inputting unit 1330, an applied preset selecting unit 1335, a preset information inputting unit 1340, a preset information selecting unit 1345, a static preset information receiving unit 1350, a dynamic preset information receiving unit 1355, a rendering unit 1360 and a display unit 1365.

The preset attribute receiving unit 1315, external preset information receiving unit 1320, static preset information receiving unit 1350, dynamic preset information receiving unit 1355 and rendering unit 1360 in FIG. 13 have the same configurations and functions of the former preset attribute receiving unit 1315, external preset information receiving unit 1320, static preset information receiving unit 1350, dynamic preset information receiving unit 1355 and rendering unit 1360 in FIG. 4 and heir details are omitted in the following description.

Referring to FIG. 13, the preset information generating unit 1310 includes a preset attribute determining unit 1311, a preset metadata generating unit 1312 and a preset rendering parameter generating unit 1313.

As mentioned in the foregoing description, the preset attribute determining unit 1311 determines preset attribute information indicating whether preset information will be applied to all data regions by being included in a configuration information region or the preset information will be applied per data region by being included in a data region. Subsequently, the preset metadata generating unit 1312 and the preset rendering parameter generating unit 1313 are able to generate one preset metadata and one preset rendering parameter or preset metadata and preset rendering parameters as many as the number of data regions.

The preset metadata generating unit 1312 receives text information indicating the preset rendering parameter and is then able to generate preset metadata. On the other hand, if a gain for adjusting a level of the object and/or a position of the object is inputted to the preset rendering parameter generating unit 1313, it is able to generate a preset rendering parameter that will be applied to the object. It is able to generate the preset rendering parameter to apply to each object. Various types of the preset rendering parameter can be implemented. For instance, the preset rendering parameter can be implemented as a channel level difference (CLD) parameter, a matrix or the like.

The preset rendering parameter generating unit 1313 is able to further generate output channel information indicating how many output channels of the object exist. The preset metadata generated by the preset metadata generating unit 1312, the preset rendering parameter generated by the preset rendering parameter generating unit 1313 and the output channel information generated by the preset rendering parameter generating unit 1313 can be transported by being included in one bitstream. In particular, they can be transported by being included in an ancillary region of a bitstream including a downmix signal or by being included in a bitstream separate from a downmix signal.

Meanwhile, the preset information generating unit 1310 is able to further generate preset presence information indicating that the preset metadata, the preset rendering parameter and the output channel information are included in a bitstream. In this case, the preset presence information can have a container type indicating the preset information or the like is included in which region of a bitstream or a flag type simply indicating whether the preset information or the like is included in a bitstream, by which the present invention is non-limited.

The preset information generating unit is able to generate a plurality of preset informations. And, each of a plurality of the preset informations includes the preset rendering parameter, the preset metadata and the output channel information. In this case, preset information generating unit is able to further generate preset number information indicating the number of the preset informations.

Thus, the preset information generating unit is able to generate and output preset attribute information, preset metadata and preset rendering parameter in a form of a bitstream.

The preset attribute receiving unit 1315 receives and outputs preset attribute information received from the preset information generating unit 1310. And, the meaning of the preset attribute information is disclosed in the aforesaid Table 1.

The external preset applicability determining unit 1325 receives an input of external preset information from the external preset information receiving unit 1320 and is then able to determine whether the external preset information is applicable to a downmix signal based on object number information included in the external preset information. The external preset information can have the bitstream structure shown in FIG. 9. Moreover, the external preset information has the same configurations and function of a preset rendering parameter, preset metadata, preset presence information, preset number information, object number information and output channel information, which are included in preset information inputted from an encoder. And, the external preset information can include external preset rendering parameter, external preset metadata, external preset presence information, external preset number information, object number information and output channel information, which are included in a bitstream inputted not from an encoder but from an external environment.

If the object number information is equal to the number of objects included in the downmix signal, the external preset information is applicable to the downmix signal. If the object number information is different from the number of objects included in the downmix signal, the external preset information is not used.

If the external preset applicability determining unit 1325 determines that the external preset information is used, the applied preset inputting unit 1330 displays metadata for determining whether to use the external preset information or the preset information to adjust an object and is then able to received an input of a selection signal for selecting information to use. According to another embodiment of the present invention, if the external preset applicability determining unit 1325 determines that the external preset information is usable, external preset information is preferentially usable by omitting this step.

If the external preset applicability determining unit 1325 determines that the external preset information is usable, the applied preset selecting unit 1335 receives preset information from the preset information from the preset information receiving unit 1310 and also receives external preset information from the external preset applicability determining unit 1325. And, the applied preset selecting unit 1335 is able to select and output the preset information or the external preset information indicated by the selection signal inputted from the applied preset inputting unit 1330.

If the preset information is selected by the applied preset selecting unit 1335, it is able to adjust an object in a manner that the preset information is applied to a data region of a downmix signal corresponding to an extension region having the preset information included therein or all data regions based on the preset attribute information outputted from the preset attribute receiving unit 1315. On the contrary, if the external preset information is selected by the applied preset selecting unit 1335, the external preset information is equally applied to all data regions of the downmix signal irrespective of the preset attribute information outputted from the preset attribute receiving unit 1315.

If the external preset information is selected by the applied preset selecting unit 1335 based on the selection signal inputted from the applied preset inputting unit 1330, the preset information inputting unit 1340 firstly displays a plurality of external preset metadatas received from the external preset metadata receiving unit 1321 on a screen of a display unit 1365 and then receives an input of a selection signal for selecting one of a plurality of the external preset metadatas. The preset information selecting unit 1345 selects one external preset metadata selected by the selection signal and an external preset rendering parameter corresponding to the external preset metadata.

In case that external preset information is used, the static preset information receiving unit 1350 is activated only. The external preset metadata selected by the selection signal and the external preset rendering parameter corresponding to the external preset metadata are inputted to the static preset metadata receiving unit 1351 and the static preset rendering parameter receiving unit 1352 of the static preset information receiving unit 1350, respectively. In this case, the display unit 1365, the preset information inputting unit 1340 and the preset information selecting unit 1345 can perform the operation once only.

On the contrary, if the applied preset selecting unit 1335 determines to use the preset information inputted from the preset information generating unit 1310, the static preset information receiving unit 1350 or the dynamic preset information receiving unit 1355 are activated according to the preset attribute information received from the preset attribute receiving unit 1315.

In this case, if the preset attribute information received from the preset attribute receiving unit 1315 indicates that the preset information is included in an extension region of a configuration information region, preset metadata selected by the preset information selecting unit 1345 and the preset rendering parameter corresponding to the preset metadata are inputted to the preset metadata receiving unit 1351 and the preset rendering parameter receiving unit 1352 of the static preset information receiving unit 1350.

On the contrary, if the preset attribute information received from the preset attribute receiving unit 1315 indicates that the preset information is included in an extension region of a data region, preset metadata selected by the preset information selecting unit 1345 and preset rendering parameter information corresponding to the preset metadata are inputted to the preset metadata receiving unit 1356 and the preset rendering parameter receiving unit 1357 of the dynamic preset information receiving unit 1355. In this case, the display unit 1365, the preset information inputting unit 1340 and the preset information selecting unit 1345 can perform the above operation repeatedly as many as the number of data regions.

Moreover, the selected external preset rendering parameter or the selected preset rendering parameter is outputted to the rendering unit 1360, while the selected external preset metadata or the selected preset rendering parameter is outputted to the display unit 1365 to be displayed on the screen of the display unit 1365. The display unit 1365 may include the same unit for displaying a plurality of preset metadatas or external preset metadatas to enable the preset information inputting unit 1340 to receive an input of a selection signal or can include a different unit. If the display unit 1365 and a display unit for displaying the preset metadata or the external preset metadata for the preset information inputting unit 1340 use the same unit, it is able to discriminate each action in a manner that a description (e.g., 'Please select preset information.', 'Preset information N is selected.', etc.), a visual object, letters and the like are configured different on the screen.

Figure 14:
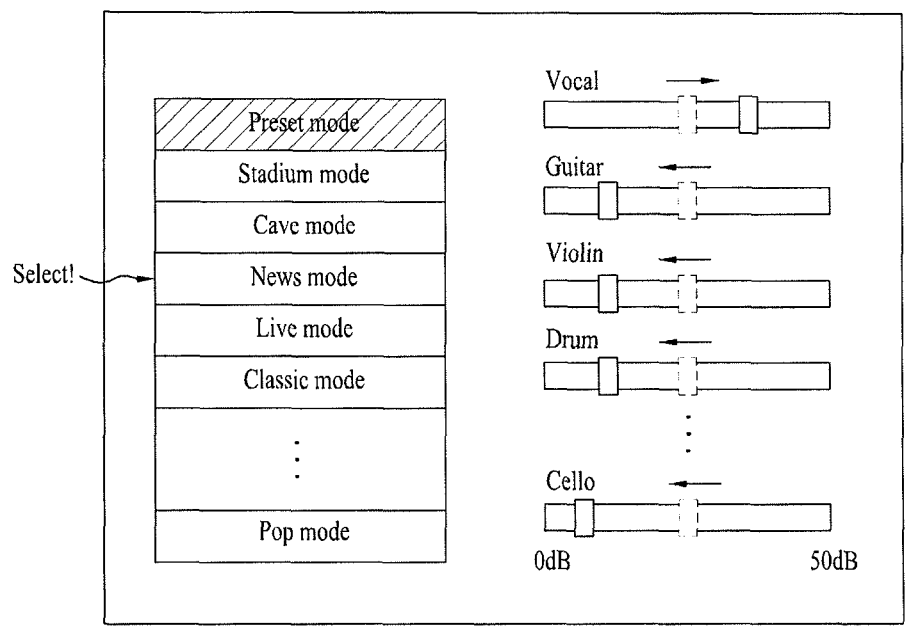
FIG. 14 is a diagram for a display unit of an audio signal processing apparatus according to another embodiment of the present invention.

FIG. 14 is a diagram for a display unit 1365 of an audio signal processing apparatus 1400. First of all, a display unit 1365 can include at least one or more graphical objects indicating levels or positions of objects adjusted using selected preset metadata or external preset metadata and preset rendering parameter/external preset rendering parameter corresponding to the preset metadata/external preset metadata. Referring to FIG. 14, in case that a news mode is selected via the preset information selecting unit 1340 from a plurality of preset metadatas or external preset metadatas (e.g., stadium mode, cave mode, news mode, live mode, etc.) displayed on the outputting unit 1365 shown in FIG. 13, a preset rendering parameter or an external preset rendering parameter corresponding to the news mode is applied to each object included in a downmix signal. In this case, a level of vocal will be raised, while levels of other objects (guitar, violin, drum, . . . cello) will be lowered.

The graphical object included in the display unit 1365 is transformed to indicate activation or change of the level or position of the corresponding object. For instance, referring to FIG. 14, a switch of a graphical object indicating a vocal is shifted to the right, while switches of graphical objects indicating the reset of the objects are shifted to the left.

The graphical object is able to indicate a level or position of an object adjusted using a preset rendering parameter or an external preset rendering parameter in various ways. At least one graphical object indicating each object can exist. In this case, a first graphical object indicates a level or position of an object prior to applying the preset rendering parameter or the external preset rendering parameter. And, a second graphical object is able to indicate a level or position of an object adjusted by applying the preset rendering parameter or the external preset rendering parameter. In this case, it is facilitated to compare levels or positions of an object before and after applying the preset rendering parameter or the external preset rendering parameter. Therefore, a user is facilitated to be aware how the preset information or the external preset information adjusts each object.

Figure 15:
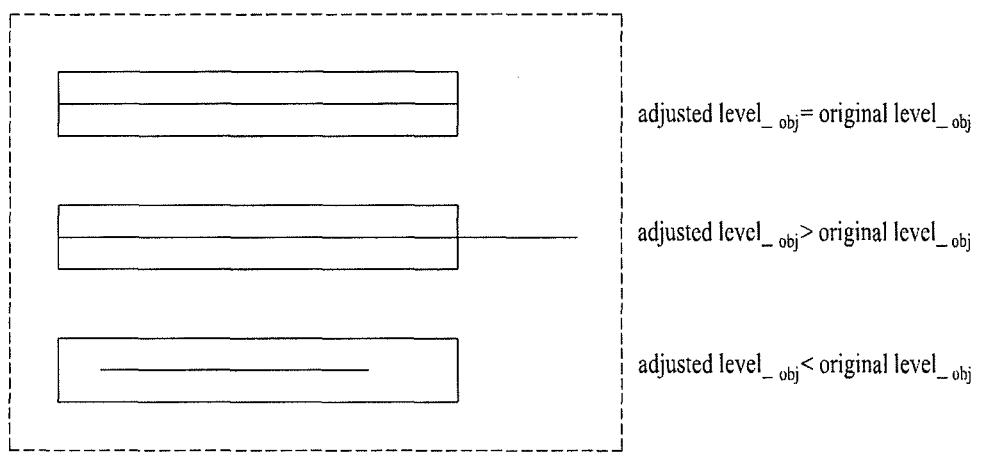
FIG. 15 is a diagram for at least one diagrammatic object displaying objects having external preset information applied thereto according to another embodiment of the present invention.

FIG. 15 is a diagram of at least one graphical object for displaying objects, to which preset information or external preset information is applied, according to a further embodiment of the present invention. Referring to FIG. 15, a first graphical object is a bar type and a second graphical object can be represented as an extensive line within the first graphical object. In this case, the first graphical object indicates a level or position of an object prior to applying preset information or external preset information to the object. And, the second graphical object indicates a level or position of an object adjusted by applying preset information or external preset information to the object.

In FIG. 15, a graphical object in an upper part indicates a case that a level of an object prior to applying preset information or external preset information is equal to that after applying preset information or external preset information. A graphical object in a middle part indicates that a level of an object adjusted by applying preset information or external preset information is greater than that prior to applying preset information or external preset information. And, a graphical object in a lower part indicates that a level of an object is lowered by applying preset information or external preset information.

Thus, using at least one or more graphical objects indicating levels or positions of objects before and after applying preset information or external preset information, a user is facilitated to be aware that how preset information or external preset information adjusts each object. Moreover, since a user is able to easily recognize a feature of preset information or external preset information, the user is facilitated to select suitable preset information or external preset information if necessary.

Figure 16:
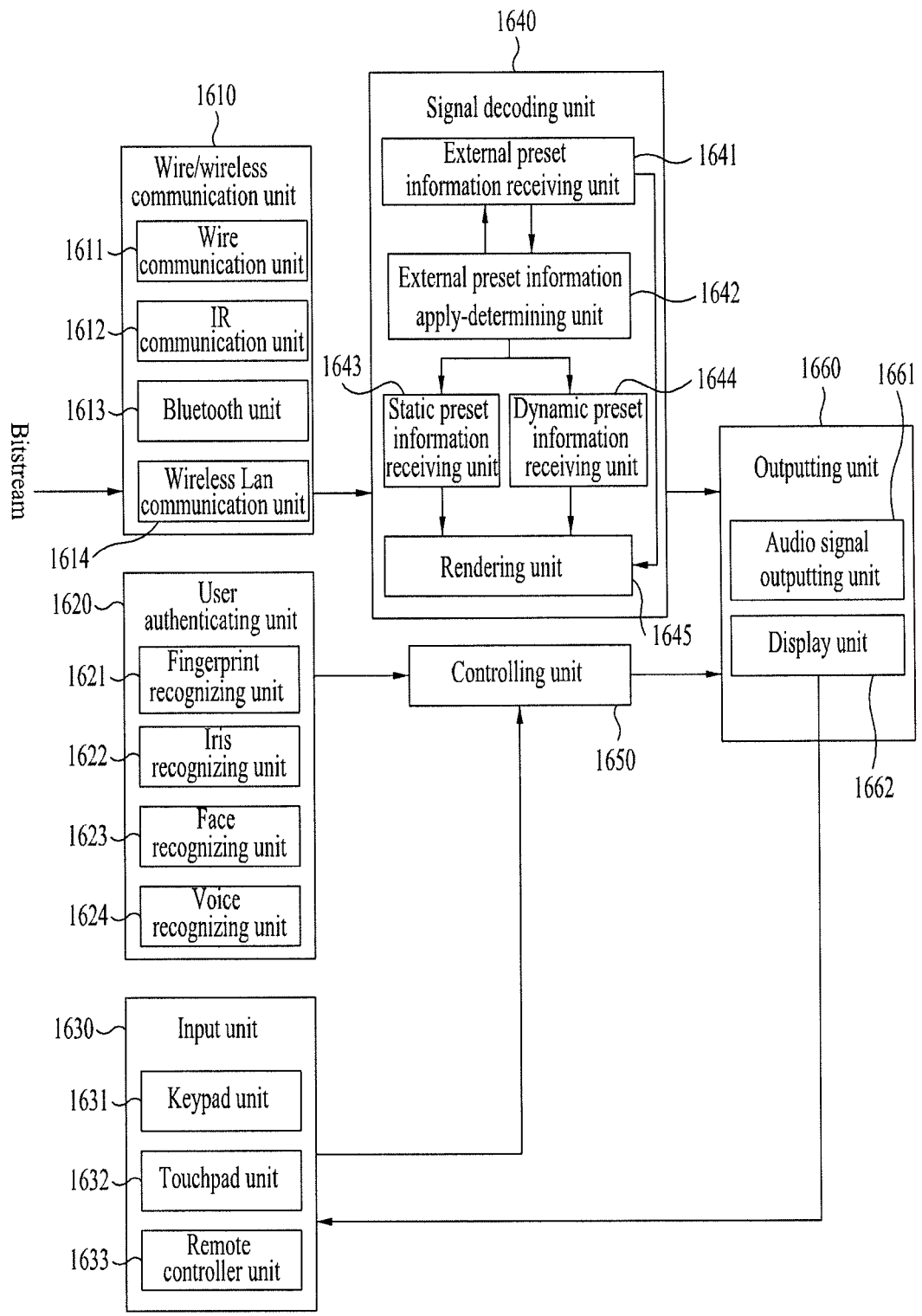
FIG. 16 is a schematic diagram of a product including an external preset information receiving unit, an external preset information applying-determining unit, a static preset information receiving unit, a dynamic preset information receiving unit and a rendering unit according to another embodiment of the present invention.
Figure 17A:
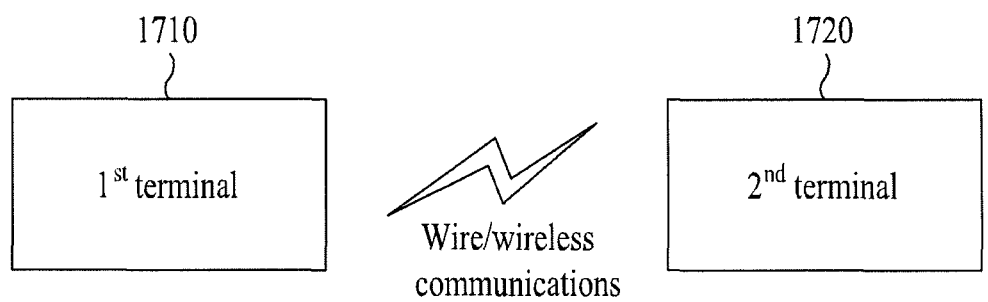
FIG. 17A and FIG. 17B are schematic diagrams for relations of products, each of which includes an external preset information receiving unit, an external preset information applying-determining unit, a static preset information receiving unit, a dynamic preset information receiving unit and a rendering unit, according to another embodiment of the present invention.
Figure 17B:
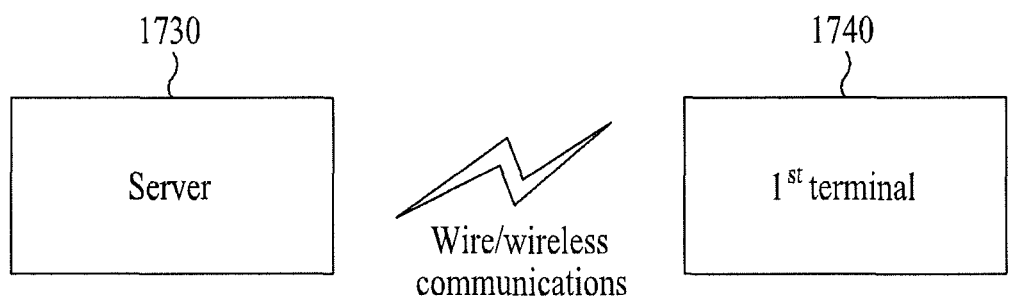

FIG. 16 is a schematic diagram of a product including an external preset information receiving unit, an external preset information application determining unit, a static preset information receiving unit, a dynamic preset information receiving unit and a rendering unit according to one embodiment of the present invention, and FIG. 17A and FIG. 17B are schematic diagrams for relations of products, each of which includes an external preset information receiving unit, an external preset information application determining unit, a static preset information receiving unit, a dynamic preset information receiving unit and a rendering unit, according to another embodiment of the present invention.

Referring to FIG. 16, a wire/wireless communication unit 1610 receives a bitstream by wire/wireless communications. In particular, the wire/wireless communication unit 1610 includes at least one of a wire communication unit 1616, an infrared communication unit 1612, a Bluetooth unit 1613 and a wireless LAN communication unit 1614.

A user authenticating unit 1620 receives an input of user information and then performs user authentication. The user authenticating unit 1620 can include at least one of a fingerprint recognizing unit 1621, an iris recognizing unit 1622, a face recognizing unit 1623 and a voice recognizing unit 1624. In this case, the user authentication can be performed in a manner of receiving an input of fingerprint information, iris information, face contour information or voice information, converting the inputted information to user information, and then determining whether the user information matches registered user data.

An inputting unit 1630 is an input device enabling a user to input various kinds of commands. And, the inputting unit 1630 can include at least one of a keypad unit 1631, a touchpad unit 1632 and a remote controller unit 1633, by which examples of the inputting unit 1630 are non-limited.

Meanwhile, if information for selecting information to use from external preset information inputted from an external preset information receiving unit 1642 and preset information inputted from the wire/wireless communication unit 1610 is displayed on a screen via a display unit 1662, a user is able to input a selection signal via the inputting unit 1630. And, the selected external preset information (or, preset information) selected based on the selected signal is inputted to a control unit 1650. Moreover, if external preset metadata for a plurality of external preset rendering parameters outputted from the metadata receiving unit 1641 are displayed on the screen of the display unit 1662, a user is able to select the external preset metadata via the inputting unit 1630. And, information on the selected external preset metadata is inputted to the control unit 1650.

A signal decoding unit 1640 includes an external preset information receiving unit 1641, an external preset information application determining unit 1642, a static preset information receiving unit 1643, a dynamic preset information receiving unit 1644 and a rendering unit 1645. Since they have the same configurations and functions of the former external preset information receiving unit 430, external preset information application determining unit 440, static preset information receiving unit 450 and dynamic preset information receiving unit 460 shown in FIG. 4, their details are omitted in the following description.

A control unit 1650 receives input signals from the input devices and controls all processes of the signal decoding unit 1640 and an outputting unit 1660. As mentioned in the foregoing description, if information on the preset metadata or external preset metadata selected by the inputting unit 1630 and a type of the selected preset information or external preset information are inputted as a selection signal to the control unit 1650 and if preset attribute information (preset_attribute_information) indicating that preset information is included in which region of a bitstream is inputted from the wire/wireless communication unit 1610, the static preset information receiving unit 1643 and the dynamic preset information receiving unit 1644 receive preset rendering parameters corresponding to the selected preset metadata and then decode an audio signal using the received parameters, based on the preset attribute information and the selection signal.

Meanwhile, if the external preset information is determined to use, an external preset rendering parameter corresponding to the selected external preset metadata is inputted to the dynamic preset information receiving unit 1643 based on the selection signal irrespective of the preset attribute information.

And, an outputting unit 1660 is an element for outputting an output signal and the like generated by the signal decoding unit 1640. The outputting unit 1660 can include a speaker unit 1661 and a display unit 1662. If an output signal is an audio signal, it is outputted via the speaker unit 1661. If an output signal is a video signal, it is outputted via the display unit 1662. Moreover, the outputting unit 1660 displays the preset metadata or external preset metadata selected by the control unit 1650 on a screen via the display unit 1662.

FIG. 17A and FIG. 17B show the relations between a terminal and a server, which correspond to the product shown in FIG. 11.

Referring to FIG. 17A, it can be observed that bidirectional communications of data or bitstreams can be performed between a first terminal 1710 and a second terminal 1720 via wire/wireless communication units. The data or bitstream exchanged via the wire/wireless communication units may include one of the bitstreams shown in FIG. 1A, FIG. 1B, FIG. 2 and FIG. 9 or the data including the preset attribute information, preset rendering parameter, preset metadata, external preset rendering parameter, external preset metadata and the like of the present invention described with reference to FIGS. 1 to 16 of the present invention.

Referring to FIG. 17B, it can be observed that wire/wireless communications can be performed between a server 1730 and a first terminal 1740.

Figure 18:
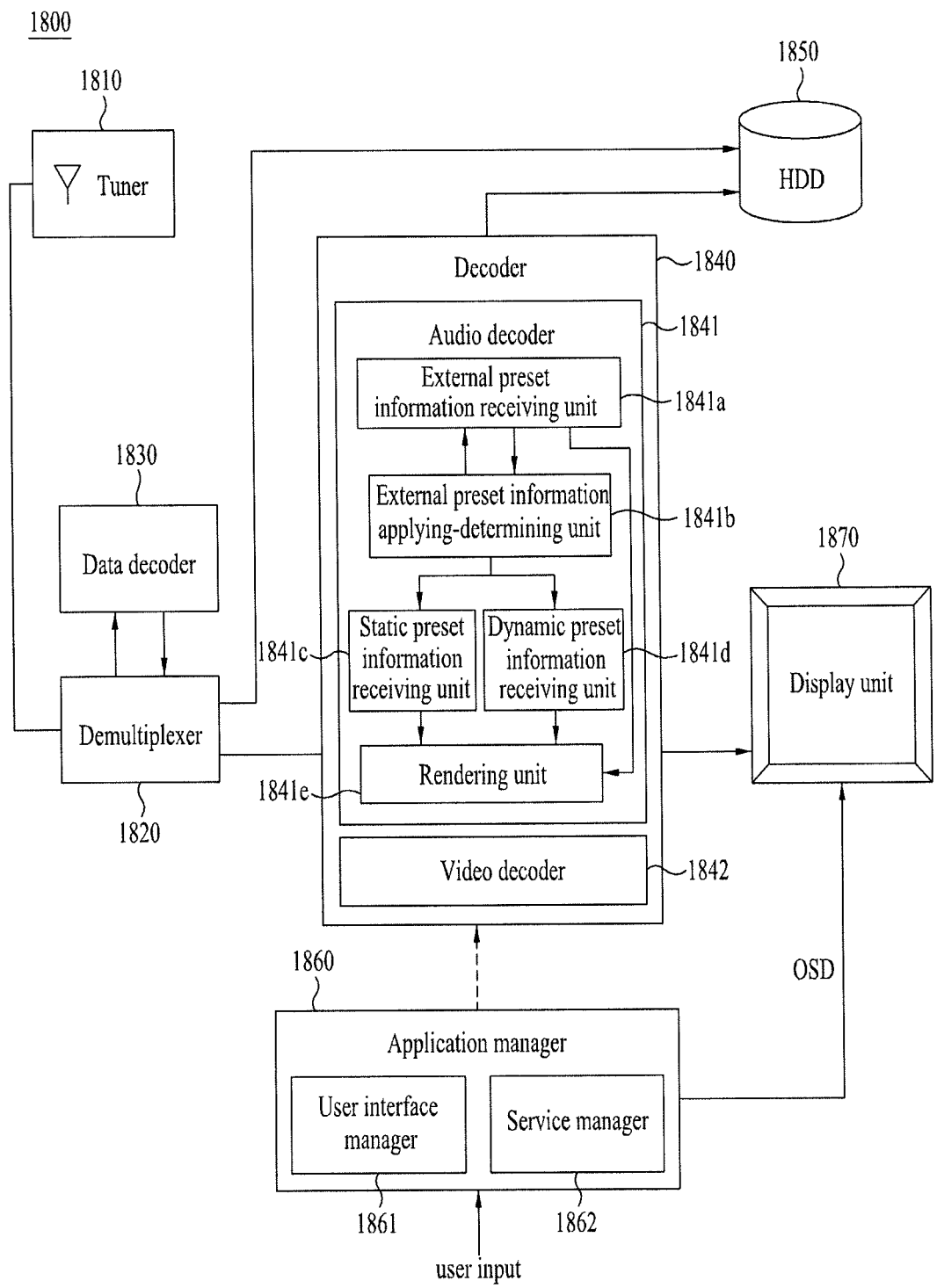
FIG. 18 is a schematic block diagram of a broadcast signal decoding apparatus including an external preset information receiving unit, an external preset information applying-determining unit, a static preset information receiving unit, a dynamic preset information receiving unit and a rendering unit according to a further embodiment of the present invention.

FIG. 18 is a schematic block diagram of a broadcast signal decoding apparatus 1800 in which an audio decoder including a preset attribute determining unit, an external preset information receiving unit, a static or dynamic preset information receiving unit and a rendering unit according to one embodiment of the present invention is implemented.

Referring to FIG. 18, a demultiplexer 1820 receives a plurality of datas related to a TV broadcast from a tuner 1810. The received data are separated by the demultiplexer 1820 and are then selected by a data decoder 1830. Meanwhile, the data selected by the demultiplexer 1820 can be stored in such a storage medium 1850 as an HDD.

The data selected by the demultiplexer 1820 are inputted to a decoder 1840 including an audio decoder 1841 and a video decoder 1842 to be decoded into an audio signal and a video signal. The audio decoder 1841 includes an external preset information receiving unit 1841*a*, an external preset information application determining unit 1841*b*, a static preset information receiving unit 1841*c*, a dynamic preset information receiving unit 1841*d* and a rendering unit 1841*e* according to one embodiment of the present invention. Since they have the same configurations and functions of the external preset information receiving unit 430, external preset information application determining unit 440, static preset information receiving unit 450 and dynamic preset information receiving unit 460, their details are omitted in the following description.

The signal decoding unit 1841 generates an output signal by decoding an audio signal using the received bitstream, preset metadata (or external preset metadata) and preset rendering parameter (or external preset rendering parameter) and then outputs a text type of the preset metadata or the external preset metadata.

A display unit 1870 visualizes or displays the video signal outputted from the video decoder 1842 and the external preset metadata outputted from the audio decoder 1841. The display unit 1870 includes a speaker unit (not shown in the drawing). And, an audio signal, in which a level of an object outputted from the audio decoder 1841 is adjusted using the external preset information, is outputted via the speaker unit included in the display unit 1870. Moreover, the data decoded by the decoder 1840 can be stored in the storage medium 1850 such as the HDD.

Meanwhile, the signal decoding apparatus 1800 can further include an application manager 1860 capable of controlling a plurality of datas received by having information inputted from a user. The application manager 1860 includes a user interface manager 1861 and a service manager 1862. The user interface manager 1861 controls an interface for receiving an input of information from a user. For instance, the user interface manager 1861 is able to control a font type of text visualized on the display unit 1870, a screen brightness, a menu configuration and the like. Meanwhile, if a broadcast signal is decoded and outputted by the decoder 1840 and the display unit 1870, the service manager 1862 is able to control a received broadcast signal using information inputted by a user. For instance, the service manager 1862 is able to provide a broadcast channel setting, an alarm function setting, an adult authentication function, etc. The data outputted from the application manager 1860 are usable by being transferred to the display unit 1870 as well as the decoder 1840.

Accordingly, the present invention provides the following effects or advantages.

First of all, the present invention individually selects to apply preset information by a data region(or frame unit) or selects to apply the same preset information to a whole downmix signal, thereby efficiently reconstructing an audio signal.

Secondly, the present invention selects one of a plurality of external preset rendering parameters using external preset metadata as well as previously set preset information without users' setting of each object, thereby facilitating to adjust a level of an output channel of an object.

Thirdly, the present invention selects more suitable external preset information by checking an object controlled by having external preset information applied thereto and selected preset metadata, thereby adjusting a level or position of an output channel of an object.

The invention claimed is:

1. An apparatus for processing an audio signal, comprising:
   an information receiving unit configured to receive a downmix signal including at least one object, and first information including preset information to render at least one object being included in the downmix signal, wherein the first information includes preset presence information indicating whether the preset information exists or not;
   an external preset information receiving unit configured to receive second information including external preset information and applied object number information indicating the number of objects to which the external preset information is being applied, the second information externally inputted, wherein the second information includes external preset presence information indicating whether the external preset information exists or not;
   an external preset applying-determining unit configured to determine whether the external preset information applies to the downmix signal or the preset information applies to the downmix signal, based on the applied object number information and the external preset presence information;
   an external preset information selecting unit configured to select one external preset information among the external preset information, when the external preset information is determined to be applied; and
   a rendering unit configured to control the object by applying the selected external preset information to all data regions of the downmix signal,
   wherein the external preset information includes an external preset rendering parameter to render the downmix signal and external preset metadata indicating an attribute of the external preset rendering parameter.

2. The apparatus of claim 1, wherein the external metadata information further indicates whether the external preset information applies to the downmix signal.

3. The apparatus of claim 1, wherein the external preset information receiving unit includes an external preset rendering parameter receiving unit receiving the external preset rendering parameter as rendering data.

4. The apparatus of claim 1, further comprising:
   a display unit configured to display the external preset metadata to select one external preset information; and
   a preset information inputting unit configured to receive a selection signal and to select one external preset metadata based on the selection signal,
   wherein the preset information selecting unit selects the one external preset information based on the selection signal.

5. The apparatus of claim 4, wherein the display unit further displays the selected external preset metadata selection based on the selection signal.

6. The apparatus of claim 4, wherein the display unit comprises one or more graphical elements indicating level or position of the object.

7. The apparatus of claim 6, wherein the graphical element is modified to indicate level or position of the object and activation.

8. The apparatus of claim 4, wherein the display unit displays the external preset metadata once, when the display unit operatively couples to the external preset information selecting unit.

9. The apparatus of claim 1, further comprising:
   an outputting unit configured to output the controlled object; and
   a storage unit configured to store the selected external preset information.

10. A method of processing an audio signal, comprising:
    receiving a downmix signal including at least one object, and first information including preset information to render at least one object being included in the downmix signal, wherein the first information includes preset presence information indicating whether the preset information exists or not;
    receiving second information including external preset information and applied object number information indicating the number of objects to which the external preset information is applied, the second information being externally inputted, wherein the second information includes external preset presence information indicating whether the external preset information exists or not;
    determining whether the external preset information applies to the downmix signal or the preset information applies to the downmix signal, based on the applied object number information and the external preset presence information;

selecting one external preset information among the external preset information, when the external preset information is determined to be applied; and controlling the object by applying the selected external preset information to all data regions of the downmix signal, wherein the external preset information includes an external preset rendering parameter to render the downmix signal and external preset metadata indicating an attribute of the external preset rendering parameter.

11. The method of claim 10, wherein the external metadata information further indicates whether the external preset information applies to the downmix signal.

12. The method of claim 10, wherein the external preset information receiving unit includes an external preset rendering parameter receiving unit receiving the external preset rendering parameter as rendering data.

13. The method of claim 10, the method further comprising:

displaying the external preset metadata to select one external preset information; and receiving a selection signal and selecting one external preset metadata based on the selection signal, wherein the preset information selecting unit selects the one external preset information based on the selection signal.

* * * * *